(12) United States Patent
Song et al.

(10) Patent No.: US 7,853,485 B2
(45) Date of Patent: Dec. 14, 2010

(54) METHODS AND SYSTEMS FOR UTILIZING CONTENT, DYNAMIC PATTERNS, AND/OR RELATIONAL INFORMATION FOR DATA ANALYSIS

(75) Inventors: Xiaodan Song, San Jose, CA (US); Belle L Tseng, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 985 days.

(21) Appl. No.: 11/562,810

(22) Filed: Nov. 22, 2006

(65) Prior Publication Data

US 2007/0118498 A1   May 24, 2007

Related U.S. Application Data

(60) Provisional application No. 60/738,825, filed on Nov. 22, 2005.

(51) Int. Cl.
*G06Q 30/00* (2006.01)
(52) U.S. Cl. ....................................................... 705/26
(58) Field of Classification Search ............... 705/26, 705/27
See application file for complete search history.

(56) References Cited

U.S. PATENT DOCUMENTS

| | | | |
|---|---|---|---|
| 6,266,649 B1 | 7/2001 | Linden et al. | 705/26 |
| 6,853,982 B2 | 2/2005 | Smith et al. | 705/27 |
| 6,912,505 B2 | 6/2005 | Linden et al. | 705/14 |
| 7,570,943 B2 * | 8/2009 | Sorvari et al. | 455/414.1 |
| 2005/0198056 A1 | 9/2005 | Dumais et al. | 707/101 |
| 2006/0041477 A1 * | 2/2006 | Zheng | 705/14 |

OTHER PUBLICATIONS

G. Adomavicius and A. Tuzhilin, "Toward the Next Generation of Recommender Systems: A Survey of the State-of-the-Art and Possible Extensions", IEEE Trans. Knwol. Data Eng., 17(6), 2005, pp. 734-749.

M. Balabanovic and Y. Shoham, "Combining Content-Based and Collaborative Recommendation", Communications of the ACM, Mar. 1997, pp. 1-9.

D. Blei, A. Ng, and M. Jordan, "Latent Dirichlet Allocation", Journal of Machine Learning Research, 3, Jan. 2003, pp. 993-1022.

(Continued)

*Primary Examiner*—Mila Airapetian
(74) *Attorney, Agent, or Firm*—Bao Tran; Joseph Kolodka

(57) ABSTRACT

The present invention is directed generally to providing systems and methods for data analysis. More specifically, embodiments may provide system(s) and method(s) including dynamic user modeling techniques to capture the relational and dynamic patterns of information content and/or users' or entities' interests. Various embodiments may include system(s) and method(s) that are based on, for example, the past history of content semantics, temporal changes, and/or user community relationship. Various embodiments may include modeling and/or analysis of the dynamic nature of an item of interest's value to a user(s)/entity(ies) over time. The dynamic factors may be consider in any manner, such as, individually or combined, sequentially or simultaneously, etc. Further, some embodiments may include, for example, system(s) and method(s) relating to analyzing data to capture user/entity interests and/or characteristics, consider content semantics and evolutionary information, and/or using community relationships of users/entities to thereby analyze information and provide dynamic conclusion(s) (e.g., recommendation(s)).

18 Claims, 27 Drawing Sheets

OTHER PUBLICATIONS

J. Breese, D. Heckerman, and C. Kadie, "Empirical Analysis of Predictive Algorithms for Collaborative Filtering", Conf. on Uncertainty in Artificial Intelligence, Madison,WI, Jul. 1998, pp. 1-20.

M. Claypool, A. Gokhale, T. Miranda, P. Mumikov, D. Netes, and M. Sartin, "Combining Content-Based and Collaborative Filters in an Online Newspaper", Proc. ACM SIGIR '99 Workshop Recommender Systems: Algorithms and Evaluation, Aug. 1999, pp. 1-8.

M. Collins, R. Schapire and Y. Singer, "Logistic Regression, AdaBoost and Bregman Distances", Machine Learning, 48, 2002, pp. 253-285.

T. Griffiths and M. Steyvers, "Finding Scientific Topics", Proc. of the Natil. Academy of Sciences, 2004, pp. 5228-5235.

T. Hofmann and J. Puzicha, "Latent Class Models for Collaborative Filtering", Proc. of the International Joint Conference in Artificial Intelligence, 1999, pp. 1-6.

K. Lang, "NewsWeeder: Learning to Filter Netnews", Proceedings of the 12th International Conference on Machine Learning, 1995, pp. 1-9.

G. Linden, B. Smith and J. York, "Amazon.com Recommendations, Item-to-Item Collaborative Filtering" IEEE Internet Computing, 7(1), 2003, pp. 76-80.

R.J. Mooney and L. Roy, "Content-Based Book Recommending Using Learning for Text Categorization", ACM SIGIR Workshop Recommender Systems: Algorithms and Evaluation, 1999, pp. 1-8.

M. Pazzani, "A Framework for Collaborative, Content-Based and Demographic Filtering", Artificial Intelligence Rev., Dec. 1999, pp. 1-16.

D. Pierrakos, G. Paliouras, C. Papatheodorou and C. Spyropoulos, "Web Usage as a Tool for Personalization: A Survey", User Modeling and User-Adapted Interaction, 13, 2003, pp. 311-372.

A. Popescul, L. H. Ungar, D. M. Pennock, and S. Lawrence, "Probabilistic Models for Unified Collaborative and Content-Based Recommendation in Sparse-Data Environments", Proc. of the 17'th Conference on Uncertainty in Artificial Intelligence, Seattle, WA, Aug. 2001, pp. 1-8.

F. J. Radermacher, "Probabilistic Reasoning in Intelligent Systems: Networks of Plausible Inference", JSTOR, 1990, pp. 704-707.

P. Resnick, N. Iacovou, M. Suchak, P. Bergstrom, and J. Riedl, "Grouplens: An Open Architecture for Collaborative Filtering of Netnews". In Proc. of the ACM Conference on Computer Supported Cooperative Work, 1994, pp. 1-18.

E. Savia, K. Puolamaki, J. Sinkkonen, and S. Kaski, "Two-Way Latent Grouping Model for User Preference Prediction", Proc. of the 21st Conference on Uncertainty in Artificial Intelligence, Edinburgh, Scotland, Jul. 2005, pp. 1-8.

J. B. Schafer, J. A. Konstan, J. Riedl, "E-Commerce Recommendation Applications", ACM KDD 2001, pp. 1-24.

A.I. Schein, A. Popescul, L.H. Ungar, and D.M. Pennock, "Methods and Metrics for Cold-Start Recommendations", Proc. 25th Ann. Int'l ACM SIGIR Conf., 2002, pp. 1-8.

U. Shardanand and P. Maes, "Social Information Filtering: Algorithms for Automating "Word of Mouth"", CHI, 1995, pp. 1-13.

I. Soboroff and C. Nicholas, "Combining Content and Collaboration in Text Filtering", Proc. Int'l Joint Conf. Artificial Intelligence Workshop: Machine Learning for Information Filtering, Aug. 1999, pp. 1-6.

X. Song, B. L. Tseng, C.-Y. Lin and M.-T. Sun, "ExpertiseNet: Relational and Evolutionary Expert Modeling", International Conference on User Modeling, Edinburgh, UK, Jul. 24-30, 2005, pp. 1-10.

X. Song, C.-Y. Lin, B. L. Tseng and M.-T. Sun, "Modeling and Predicting Personal Information Dissemination Behavior", ACM SIGKDD Intl. Conf. on Knowledge Discovery and Data Mining, Chicago, Aug. 21-24, 2005, pp. 479-488.

L. Ungar and D. Foster, "Clustering Methods for Collaborative Filtering", Proc. Recommender Systems, Papers from 1998 Workshop, TR-WS-98-08, 1998, pp. 1-16.

D. Widyantoro, T. Ioerger and J. Yen, "Learning User Interest Dynamics with a Three-Descriptor Representation", to appear in the Journal of the American Society for Information Science, pp. 1-52.

* cited by examiner

2400

METHODS AND SYSTEMS FOR UTILIZING CONTENT, DYNAMIC PATTERNS, AND/OR RELATIONAL INFORMATION FOR DATA ANALYSIS

This application claims the benefit of U.S. Provisional Application No. 60/738,825 filed Nov. 22, 2005, the entire disclosure of which is hereby incorporated by reference as if set forth fully herein.

This disclosure may contain information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND

1. Field of the Invention

The present invention relates to the field of data mining and analysis and, more specifically, to methods and systems relating to utilizing content, dynamic patterns, and/or relationship information in data analysis.

2. Description of Related Art

Recent expansion of the availability and amount of information that people throughout the world are exposed to and have available to them is incredible. For example, information available on computer networks, e.g., intranets, the Internet, email, cellular networks, and other sources of digital media, have provided people access to an immense wealth of information. In fact, the amount of information available to people and organizations is starting to overwhelm people and organizations. Further, more people and organizations rely more-and-more on the Internet and various information networks to obtain information. As a result, it is desirable to have tools that help manage the massive amount of information available to people and organizations and to analyze and provide desired information or results from that analysis that is more focused, concise, and better suited for their needs. For example, it may be desirable to have method(s) and system(s) that may automatically predict, identify and/or recommend information (e.g., items, documents, etc.) that people or organization may find more or most useful. Therefore, a number or method(s) and system(s) have been developed that help to manage the massive amount of information available by, for example, analyzing the information available and providing recommendations.

Recommendation method(s) and system(s) have become a particularly important area since the appearance of the collaborative filtering in the mid 1990s. Examples of various applications for recommendation method(s) and system(s) include recommending books, CDs, and other products at, for example, Amazon.com, recommending movies by MovieLens, etc. There are also a number of methods and systems that provide personalized recommendations, content, and services to users. Some examples include those describe in U.S. Pat. Nos. 6,266,649, 6,912,505, and 6,853,982, and U.S. Patent Application No. US20050198056.

Content-based filtering, collaborative filtering, and hybrid approaches are three exemplary recommendation systems. Some examples of these approaches are described in D. Pierrakos, G. Paliouras, C. Papatheodorou, and C. Spyropoulos, Web usage mining as a tool for personalization: A survey. User Modeling and User-Adapted Interaction, 13:311-372, 2003; G. Adomavicius, and A. Tuzhilin, Toward the Next Generation of Recommender Systems: A Survey of the State-of-the-Art and Possible Extensions, IEEE Trans. Knowl. Data Eng. 17(6), 734-749, 2005; and M. Balabnovic and Y. Shoham, Content-Based, Collaborative Recommendation, Communications of the ACM, March 1997. Although these approaches give some reasonable results, there is room for improvement in the systems and methods of data analysis and particularly with respect to providing recommendations.

The prior systems and methods lack certain useful capabilities. For example, prior recommendation systems and methods typically do not consider the dynamic nature of both information (e.g., the change in value of information over time) and personal interests (e.g., changing interests of a user or entity). The importance of items and the interests of users are both naturally dynamic and change over time. Therefore, there is a need for recommendation systems and methods that can make recommendation(s) based on, for example, the dynamic nature of an item of interest and/or formal or informal communities to which user(s)/entity(ies) are a part of, or interested in.

SUMMARY

The present invention is directed generally to providing system(s) and method(s) for data analysis. More specifically, embodiments may provide system(s) and method(s) including dynamic modeling techniques to capture the relational and dynamic patterns of information content and/or users' or entities' interests. Various embodiments may include system(s) and method(s) that are based on, for example, the past history of content semantics, temporal changes, and/or user community relationship. Various embodiments may include modeling and/or analysis of the dynamic nature of an item of interest's value to a user(s)/entity(ies) over time. Further, various embodiments may include, for example, system(s) and method(s) relating to analyzing data to capture the dynamic nature of user/entity interests, preferences, and/or characteristics. Various embodiments may use the dynamic aspects of items and user/entity interest to model user(s)/entity(ies) relationships, rank item(s), and/or providing various inferences and conclusion(s) (e.g., recommendation(s)) using formal and/or informal community relationships of users/entities. The invention may include data analysis system(s) and method(s) that include, for example, feature extraction, content analysis, dynamic pattern analysis, community construction, an adaptive user model, and/or a recommender. Various embodiments may include dynamic user modeling system(s) and method(s) or procedure(s) to capture the relational and dynamic patterns of users' interests based on, for example, the past history of content semantics, temporal changes, and/or user(s)/entity(ies) community relationship. Various embodiments may also include procedures that may represent both users' and items' (e.g., documents') dynamic patterns and may combine them both to provide various inferences and conclusions (e.g., recommendation(s)). The dynamic factors may be consider in any manner, such as, individually or combined, sequentially or simultaneously, etc. In various embodiments, the invention may be a computer implemented invention.

In various embodiments, the present invention is directed to providing a hybrid recommendation technique including collaborative filtering and content based filtering attributes in which, for example, both the dynamic aspects of item's changing value and user's interest may be considered in providing recommendations. More particularly, the present invention may include system(s) and method(s), referred to herein as Community Based Dynamic Recommendation (CBDR), which may exploit one or more factor(s), for example, an items' content semantics, an items' dynamic characteristics such as expiration times, users' characteristics such as intentions, users' evolving interests, and/or users' relationships and may be based on formal and/or informal communities. This recommendation approach may infer, for example, user interests, community structures, etc. The CBDR may be performed for, e.g., both informal communities, in which people with similar evolutionary interests may be grouped together, and/or formal communities, in which people may be grouped together using, for example, a formal relational chart and/or organization chart. Further, some embodiments may include, for example, a generative probabilistic model, referred to herein as a Content-Time-Community (CTC), to assess the dynamic aspects of users/entities, which may construct informal communities of people/user(s)/entity(ies) with similar evolutionary preferences and interests, in which the contextual, relational, and temporal aspects may be simultaneously considered. As such, various embodiments may use the community-based scheme and thereby avoid the cold-start problem of new users. In this respect, people from the same community may be provided with the same set of recommendations without need to include items (e.g., documents) that have been specifically retrieved by the people/user(s)/entity(ies). Various embodiments may utilize time sensitive adaptive modeling to assess the dynamic aspects of items that may rank items of interest based on user(s)/entity(ies) communities. This time-sensitive adaptive modeling may be, referred to herein as a Time-Sensitive Adaboost procedure, and may rank, for example, item (e.g., documents) contents based on leveraging dynamic factors, for example, freshness, popularity, item lifespan, expiration status, user intention, and/or other attributes. As one skilled in the art would recognize, the CTC and time-sensitive Adaboost techniques may be used independently or together, with this or other data analysis procedures. Further, one skilled in the art will recognize that the present invention may be applied to numerous applications in which a prediction, trend or recommendation is desired to be derived from information contained in a data set.

Still further aspects included for various embodiments will be apparent to one skilled in the art based on the study of the following disclosure and the accompanying drawings thereto.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and.

DETAILED DESCRIPTION

Figure 1:
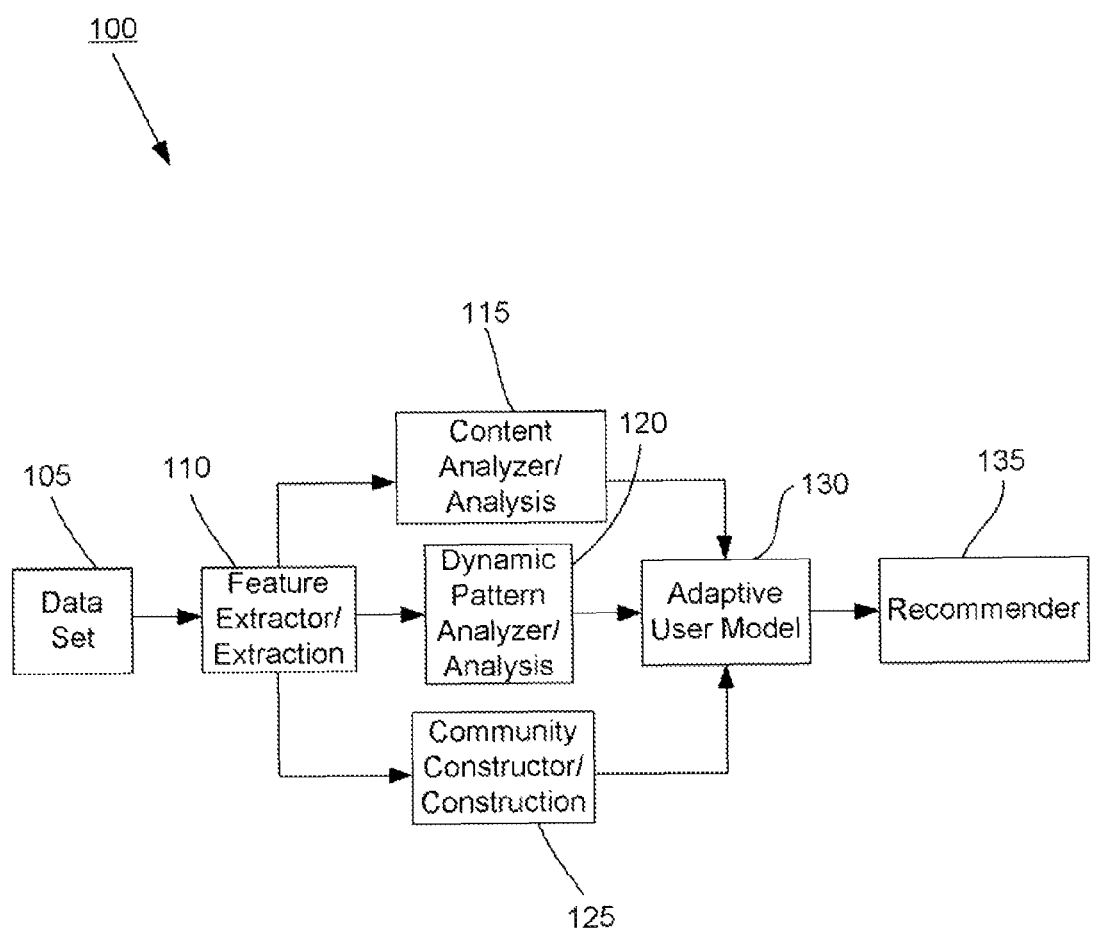
FIG. 1 is an exemplary general community-based dynamic data analysis approach, according to at least one embodiment.

The present invention is directed generally to providing systems and methods for data analysis. More specifically, the present invention may perform dynamic data analysis taking into consideration various data characteristics (e.g., items) and/or user/entity characteristics. For example, consideration of user/entity changing interest and/or an item's usefulness may prove more beneficial at predicting future interests and/or providing improved recommendations. Various embodiments of the present invention may model evolutionary and relational behaviors for community based dynamic recommendation. The invention may include data analysis system(s) and method(s) that include feature extraction, content analysis, dynamic pattern analysis, community construction, an adaptive user model, and/or a recommender. Various embodiments may include dynamic user modeling system(s) and method(s) or procedure(s) to capture the relational and dynamic patterns of users' interests based on, for example, the past history of content semantics, temporal changes, and/or user(s)/entity(ies) community relationship(s). Various embodiments may also include procedures that may represent both users'/entities' (e.g., individuals, organizations, etc.) and items' (e.g., documents, products, services, etc.) dynamic patterns and may combine them both to provide various inferences and conclusion(s) that may be used to generate, for example, predictions, recommendation(s), etc., derived from analyzing data from a data set.

Although the present invention has numerous applications, one exemplary application that will be used herein to describe the present invention is data analysis of information found in documents maintained in a data set, so as to provide a personalized recommendation to a user/entity as to which documents they should review. However, one skilled in the art will recognize that invention is also applicable to numerous other applications that may, or may not be, described or mentioned herein (e.g., stock price analysis and predictions). In any case, the system(s) and method(s) of the present invention described herein may exploit several dynamic factors, for example, document expiration times, users' intentions and/or users' evolving interests, which may be used to build models for recommending items to users/entities based on formal and/or informal communities.

Content-based filtering characterizes what a user likes, based on the past history of the user activity and the classification of the items. For example, a content-based book recommender system may use information extraction and machine learning techniques for text categorization. Another content-based filtering system may adaptively construct a user's model from the browsing behavior of the user, based on the similarity between Web documents containing news items. Content-based systems can recommend new items to users. However, they usually require a significant amount of time on user model training or depend on manually created user profiles. Furthermore, they are usually limited by the features that are explicitly associated with the items. If the features of two different items are literally the same, then they become indistinguishable because they contain, for example, the same words, even though these same words are not actually referring to the same matter or content. As a result, content-based systems will find it difficult to provide accurate recommendations for a new user having very few data access or rating history (e.g., a "cold start" problem).

Collaborative filtering approaches may infer a user's interests/preferences from that of the other people with similar tastes by considering what the user's is accessing or selecting and concluding that based on that selection the user should like what other people who previously accessed or selected the same thing may have also accessed or selected. A variety of collaborative filtering systems and algorithms have been developed to identify users of similar interests. Nearest Neighborhood, Bayesian Network, and Clustering are three major modeling methods. Nearest Neighborhood is the most typical method that computes similarity scores between all pairs of users, and the predictions for a given user are generated by weighting other users' ratings proportionally to their similarity to the user. A variety of similarity metrics have been tested, including correlation, mean-squared difference, or vector similarity. Bayesian Network methods construct offline decision trees of user interests, and are suitable for static environments, but not frequently changing scenarios. Clustering methods identify groups of users who have similar interests. In order to make accurate recommendations, a collaborative filtering system must first learn users' preferences on items. The fact that new items must be chosen by some users before they can be recommended to other users may also create what is known as the 'cold start' problem. Recommendations are strongly biased toward what have been chosen in the past. This usually results in aggregating recommendations of just the most popular items.

Several recommendation systems use a hybrid approach by combining collaborative and content-based methods, which helps to avoid the above mentioned limitations of content-based and collaborative systems. The content-based and collaborative systems can be combined by including two separated recommenders, adding content-based characteristics to Collaborative Models, adding collaborative-based characteristics to Content Models, or building a unified model.

The importance of items and the interests of users are both naturally dynamic. However, this evolutionary property of both items and users had not previously been addressed by content-based, collaborative, and/or hybrid recommender systems and techniques. For instance, time may play an important role for collaborative filtering. People's tastes and organization's objectives typically change over time so that it is unlikely that data drawn from a long time ago will be useful in general for suggesting recommended items to the other users over time. On the other hand, users with a similar evolutionary trend on their tastes may find the data helpful in selecting valuable items for them. Some content-based approaches, have studied how to learn users' long-term and short-term interest categories in a dynamic environment. They have proposed a model to represent a user's interests, which maintains a long-term interest descriptor to capture the user's general interests and two short-term interest descriptors (a positive and a negative) to keep track of the user's more recent, faster-changing interests. In any case, these studies have not gone far enough to utilize the dynamic nature of a user's interest and an item's value.

The present invention may include, for example, a hybrid prediction/recommendation approach that may consider changes in both the value of an item or document content and/or user/entity interests, which is referred to herein as Community Based Dynamic Recommendation (CDBR). CDBR may provide predictions/recommendations based on formal community and/or informal community user/entity associations or relationship. A generative probabilistic model, referred to herein as a Content-Time-Community (CTC) model, may be used to construct informal communities of people/users/entities with similar evolutionary preferences and interests, in which the contextual, relational, and temporal aspects may be simultaneously considered. This community-based technique may be used to avoid the cold-start problem of new users/entity(ies) that may be experienced with a explicit personalized scheme (e.g., providing an inference, prediction, and/or recommendation may not be possible due to lack of data or information about a particular user(s)/entity(ies)). A means for assessing changes in user(s)/entity(ies) interest over time may be provided by what is referred to herein as a time-sensitive Adaboost procedure or process and may be used for ranking item (e.g., documents) contents based on leveraging dynamic factors such as freshness, popularity, item life-span, expiration status, user intention, and/or other attributes. Using these techniques, a community-based dynamic recommendation (CBDR) scheme may be used to infer various user interests as well as community structures. Of course, the various aspects mentioned above may be considered sequentially, individually or in any order.

Applying the particular application of the present invention to the particular application of providing recommendations, one problem solved is how recommendation system(s) and method(s) can adapt to the dynamic aspects of both the value of an item or content and the evolution of the user interest. Value of content and/or items may change over time. For example, with respect to information contained in documents, some documents are time-sensitive and may expire quickly with a life-time as short as several weeks (e.g., some news information). Some information may be timeless, for example documents such as classic technical papers may be of continuous interest for many people. Some people's/user's/entities' intentions may also be different. For example, some users tend to log into various information databases (e.g., the Internet) to get update information, so they may mostly access and read relatively recently added information (e.g., the latest news related information). Others log in to various information databases to look for specific information, and they may tend to refer to long-term documents. Also, people's interests also evolve over time or may be sporadic. One person, who is interested in a certain topic one year ago, may not care about the same topic any more or at a later time, and changes their interests to something else at least for a period of time, or forever. Thus, the present invention may consider, for example, information content semantics, evolutionary information, and user/entity community relationships and in various particular applications (e.g., providing recommendations) use them to analyze the dynamic aspects of items of interest and user(s)/entity(ies).

Various embodiments of the present invention may take these components and apply them to, for example, model and predict peoples' intentions and/or classify the semantic types and evolutionary characteristics of items. In recently developed data analysis methods and systems, user models may be represented as relational and evolutionary graphs. These properties may be incorporated together for predicting the human behavior of receiving and disseminating information. In the present invention, this approach has been expanded upon by the "Content-Time-Community" (CTC) model which has been developed for constructing, for example, the informal communities of people with similar evolving preferences and interests. Further, the "time-sensitive Adaboost" procedure has also been developed to build adaptive user models that will be, for example, used for ranking items such as documents in a community-based recommendation system. Based on these new approaches, the Community-Based Dynamic Recommendation (CBDR) scheme has been developed for building a system that may be applied to, for example, dynamic database document recommendation applications.

Various embodiments of the present invention may provide a novel dynamic user modeling method to capture the relational and dynamic patterns of users'/entities' interests based on the past history of, for example, content semantics, temporal changes, and user community relationship, and may do so simultaneously. This modeling methodology may solve the cold-start and/or concept drift problems. In particular embodiments, the system(s) and method(s) of the present invention may explicitly represent both users' and documents' dynamic patterns, and may use them for making inferences, predictions and/or conclusions (e.g., providing personalized recommendations)

To tackle the new-user 'cold-start' problem, recommendations may be conducted at the community level. People/users/entities from the same community may be provided with the same set of recommendations, and this set may exclude the documents that have been retrieved by the specific user/entity to which a recommendation is to be given. In various embodiments, both the formal communities, which may be constructed by using, for example, an organizational chart, and/or informal community, in which people with similar evolutionary interests are grouped together, may be used. As such, a new user/entity may be assigned to an existing community profiles in order to avoid the cold-start problem.

One objective of the invention may be to push or provide relevant information to user(s)/entity(ies) at the right time. To achieve this objective, the invention may focus on dynamic adaptation of the value of content or an item of interest to user(s)/entity(ies) and the evolution of a user's/entity's needs or interest. Personalized dynamic recommendation may require a determination of dynamic patterns in both user's behaviors and documents' characteristics, as well as an understanding of how they affect personalized recommendation. Thus, the invention may find evolving communities and content topics, and rank items adaptively based on the changing dynamics.

In at least one embodiment direct to providing personalized document recommendations, relational and dynamic patterns may be explored for clustering people into communities with similar dynamic interests. Features, for example a bag of words from the abstracts and titles of the documents, may be extracted from a data set to describe, for example, the content of the documents, and the freshness, popularity, authors of the documents. User models from both community level and individual level may be provided to combine the contextual, relational and temporal information. The time-sensitive Adaboost may be used to help rank the various documents to selected recommendations.

Referring now to FIG. 1, an exemplary block diagram of a general community-based dynamic data analysis approach 100 is provided, according to at least one embodiment of the present invention. A data set 105 to be analyzed may be provided. The data set may be data maintained in an electronic form on a computer or computer network, for example, information related to products, services, news, research, books, etc. and may include documents, click streams, user/entity biographical information, etc. A feature extraction/extractor 110 may be coupled to the data set 105, and may extract various features from the data. These features may include, for example, key information related to the items of interest and the user/entity for which an inference, prediction, or conclusion may be developed. For example, in the particular application of providing a recommendation of various documents a user/entity may be interested in reviewing, the features extracted may include a group of words from the abstracts and titles of various documents that help describe the content of the documents, the authors name, relationship or collaboration of authors, the date of publication of the document, an identifier of the source of the document (e.g., organization that published the document), information of how often and when the document has been accessed, the click stream history for a user/entity, identifier for any association to which a user/entity is a member, background of a user/entity, etc.

The feature extractor/extraction 110 may be coupled to a content analyzer/analysis 115, a dynamic pattern analyzer/analysis 120 and a community constructor/construction 125. The content analyzer/analysis 115 may, for example, provide the content analysis for determining whether there is similarity between various items in the data set. For example, the content analyzer/analysis 115 may determine if there is word similarity, topic similarity, etc. between various items in the data set. The dynamic pattern analyzer/analysis 120 may, for example, provide the analysis for determining such things as the popularity of the data or information, the freshness of the data or information (e.g., is the information less relevant now), the expiration status of the data or information (e.g., is the data or information expired or outdated), the anticipated life-span of the data or information, changes in user/entity actions and/or intentions, etc. The community constructor/construction 125 may, for example, determine various relationships between users/entities. This may include any formal association or informal association between users/entities. The content analyzer/analysis 115, dynamic pattern analyzer/analysis 120 and/or community constructor/construction 125 may be coupled to an adaptive user model 130. The adaptive user model 130 may be, for example, a time sensitive model that considers variation in information over time to estimate a user'/entity's dynamically changing interest and/or an item's (of interest) change in value. The adaptive user model 130 may be coupled to a recommender 135. The recommender 135 may provide various insights, suggestions, conclusions, and/or recommendations about item(s) to the user/entity based upon the nature of the information, the characteristics of the user, and the dynamic aspects of, for example, the users/entity interests and/or item's change in value.

Figure 2:
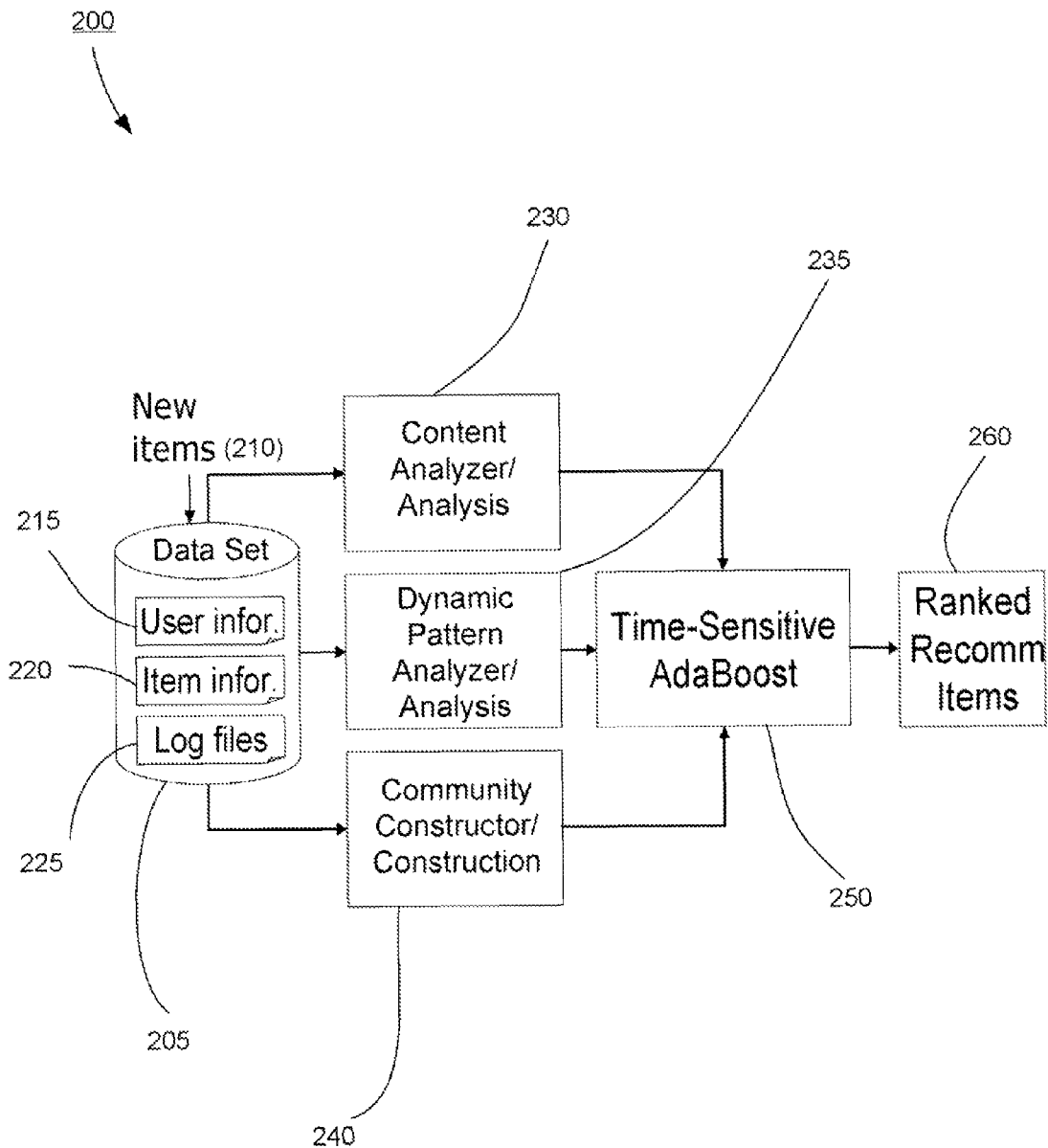
FIG. 2 is an exemplary overview of a more particular Community-Based Dynamic Recommendation scheme based on a dataset containing both user and item information, and a time-sensitive Adaboost, according to at least one embodiment.

Referring to FIG. 2, one more specific example of a dynamic analysis scheme 200 is provided, referred to herein as the Community-Based Dynamic Recommendation (CBDR) approach, and may be based on a data set including both user and item information, and including a time-sensitive Adaboost, according to at least one embodiment of the present invention. A data set 205 to be analyzed may be provided, and may repeatedly receive new items 210 of information or data. The data set 205 may be data maintained in an electronic form on a computer or computer network which may include, for example, user information 215, item information 220, and/or user log files having, for example, data tracking information. The data set 205 may include various other information, for example, information related to products, services, news, research, books, etc. and may include documents, click streams, user/entity biographical information, etc. The data set 105 may be coupled to a content analyzer/analysis 230, a dynamic pattern analyzer/analysis 235 and a community constructor/construction 240. These may include similar in feature/function as the content analyzer/analysis 115, dynamic pattern analyzer/analysis 120, and community constructor/construction 125 of FIG. 1. However, they may further include a means for performing feature extractor/extraction for their particular application.

The content analyzer/analysis 230 may, for example, provide the content analysis for determining whether there is similarity between various items in the data set. For example, the content analyzer/analysis 230 may determine if there is word similarity, topic similarity, etc. between various items in the data set. The dynamic pattern analyzer/analysis 235 may, for example, provide the analysis for determining such things as the popularity of the data or information, the freshness of the data or information (e.g., is the information less relevant now), the expiration status of the data or information (e.g., is the data or information expired or outdated), the anticipated life-span of the data or information, changes in user/entity actions and/or intentions, etc. Dynamic factors from both users and documents point of view may be analyzed. For example, according to how long people will be interested in them, items, information and/or documents may be classified into two types: short-term and long-term. Then, users' intentions, for example, getting updated news or looking for specific information may be detected based on the types of information and/or documents they download. Furthermore, the expiration dates of items, information, and/or documents may be predicted so as to retire or remove some items, information, and/or documents from the recommendation candidate list (as will be described in more detail later).

The community constructor/construction 240 may, for example, determine various relationships between users/entities. This may include any formal association or informal association between users/entities. The community constructor/construction 240 may consider both formal and informal communities. A formal community may be constructed based on, for example, an organization chart, which is simply based on the fact that people from the same organization, company, or department of the same company, etc., may tend to have similar interests, since they may have similar subject matter or educational backgrounds and/or may be working on similar projects or objectives. In various embodiments, the community constructor/construction 240 may include a Content-Time-Community (CTC) model, which is a generative probabilistic model that will be described in more detail below, that may be used to construct informal communities based on, for example, people's preference and similarity of interests.

The content analyzer/analysis 230, dynamic pattern analyzer/analysis 235 and/or community constructor/construction 240 may be coupled to a time-sensitive Adaboost 250. As described and explained in more detail below, the time-sensitive Adaboost may be a stage-wise estimation procedure that incorporates the evolutionary changes of the user/entity interest and the value of the an item over time. In any case, a ranked recommender for items 260 may be coupled to the time-sensitive Adaboost 250, so as to provide a ranked list of items (e.g., products, documents, services, etc.) to be recommended to a user/entity.

Figure 3:
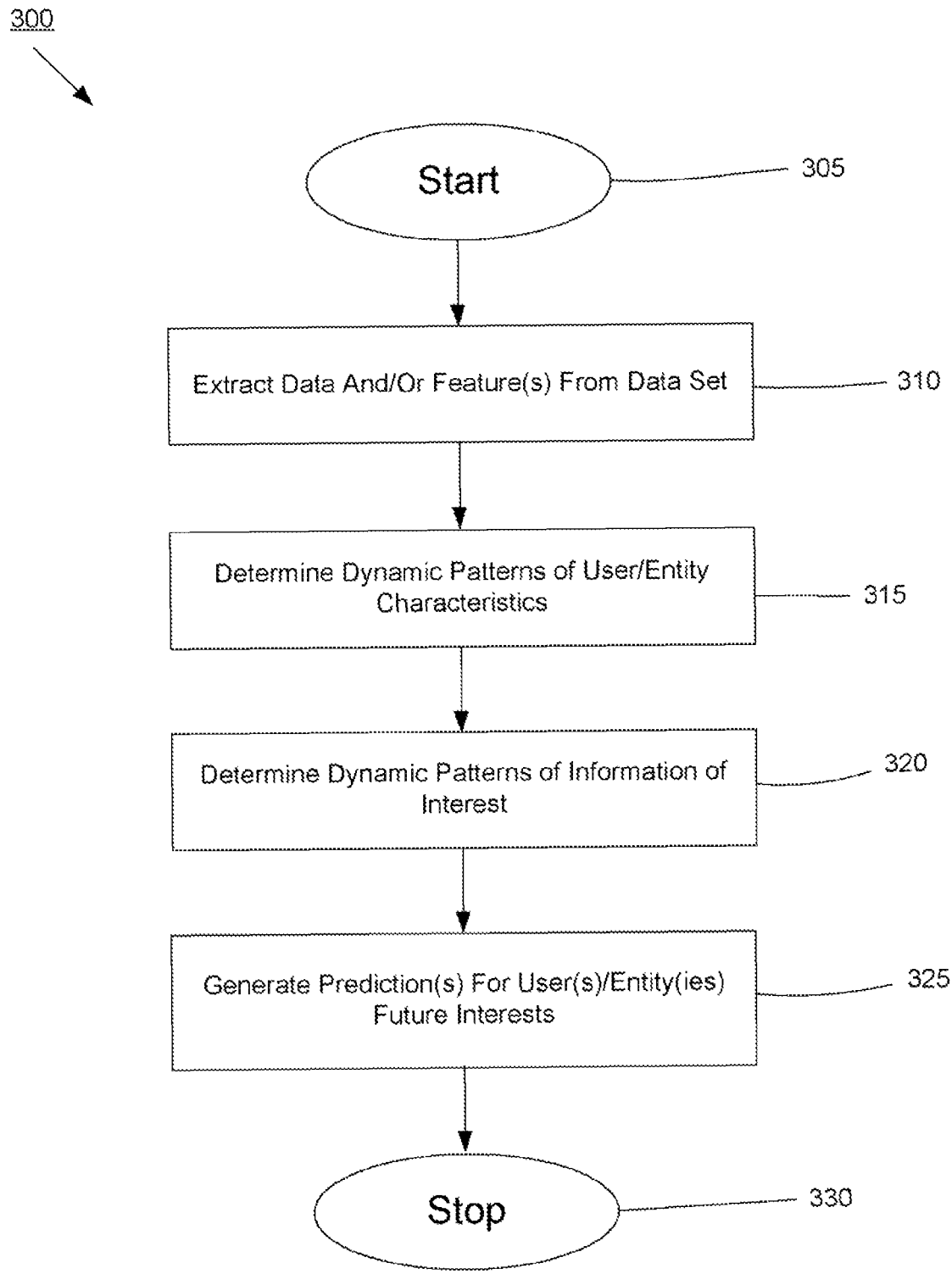
FIG. 3 is an exemplary flowchart depicting dynamic pattern analysis consisting of determining patterns from both the items' and users' perspectives, according to at least one embodiment.

Referring to FIG. 3, an exemplary flowchart depicting a dynamic pattern analysis process or procedure 300 including determining patterns from both the items' and users' perspectives is provided, according to at least one embodiment of the invention. At step 305, the process may start as triggered by, for example, a user/entity accessing data or requesting information about data in a data set. Then, at step 310, data and/or features relating to the data may be extracted from the data set. Next, at step 315, various dynamic patterns of user/entity characteristics may be analyzed, determined, identified and/or characterized. Then, at step 320, various dynamic patterns related to items/information of interest may be analyzed, determined, identified and/or characterized. Next, at step 325, a prediction and/or recommendation for user(s)/entity(ies)

future interest may be generated and/or provided. At step 330 the process may stop and await a future query, inquiry and/or request.

Figure 4:
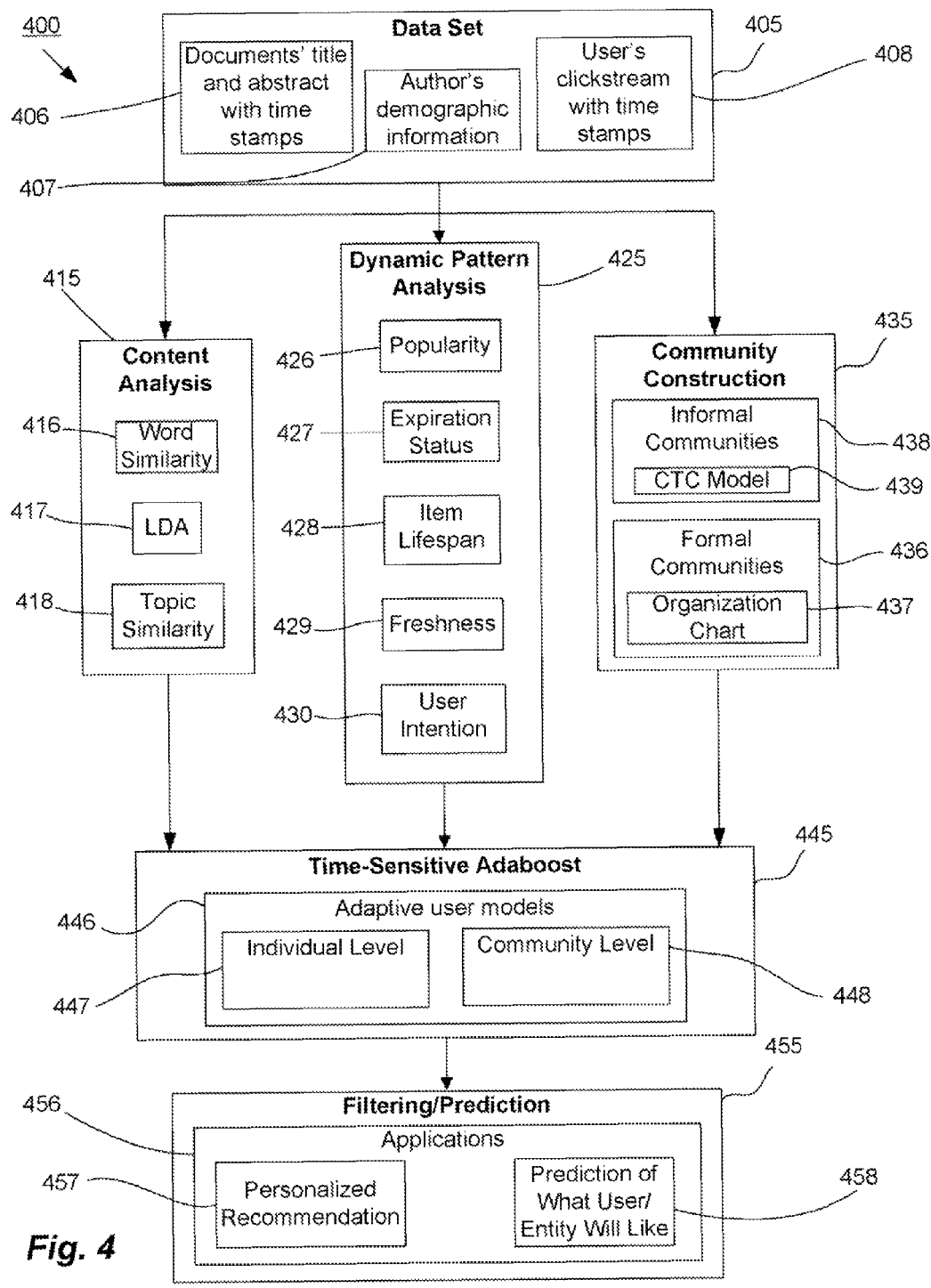
FIG. 4 is an exemplary illustration of a detailed Community-Based Dynamic Recommendation scheme, according to at least one embodiment.

FIG. 4 is another exemplary illustration of a Community-Based Dynamic Recommendation scheme 400, according to at least one embodiment of the present invention. This example may be directed more particularly to applying the invention to data analysis for document data (e.g., news articles, technical journal articles, books, etc.). In this example, data set 405 may include documents title and abstract with time stamps 406, author's demographic information 407 and/or users' click steam with time stamps 408. The information in the data set 405 may be utilized for content analysis 415, dynamic pattern analysis 425, and community construction 435.

Content analysis 415 may include word similarity analysis 416, Latent Dirichlet Allocation (LDA) analysis 417, and topic similarity analysis 418. With respect to content analysis 415, a problem may occur when assessing similarity of documents based on raw word count in each document. Unfortunately in the English language, words may be synonyms and thus have the same meaning even though they are different words, and words may be polysems and take on different meanings for different uses or contexts. This distinction must be determined and overcome by the word similarity analysis 416. With respect to topic similarity analysis 418, there may be topics that based on their description may not appear to be similar, but they are. This distinction must be determined and overcome. With respect to LDA, 417, each document may have a probability distribution over topics and each topic may have a probability distribution over words. The LDA may be used to more accurately reflect the sorting of various documents into topics by producing mixture components and mixture weights. These content analysis aspects of the invention will be described in more detail below.

Dynamic pattern analysis 425 may include, for example, popularity 426, expiration status 427, item life-span 428, freshness 429, and user intention 430. Item popularity 426 may indicate how many times one item is accessed during a time period. Expiration status, 427 may indicate whether a particular item is more or less likely to have lost its value. This is a gage to reflect the fact that in various situations, the longer an item is not accessed by anyone, the less likely it is that the item will be accessed in the future; so, it may have expired and be no longer of any value in predicting the future. The item life-span 428 pattern analysis may be used to identify items that may be of short-term interest (e.g., announcements, conference notes, etc.) and those that may be of long term interest (e.g., text books, seminal technical articles, reference manuals, etc.). Freshness 429 may be an assessment and utilization of the difference between a user's/entity's log in or data access time and the item's initial disclosure or publication time. Finally, user intention 430 detection may be an assessment of whether the user/entity is typically more interested in short term type of information or long-term type of information. These dynamic pattern analysis aspects of the invention will be described in more detail below.

Community construction 435 may include both formal communities 436 and informal communities 438. The formal communities 436 may be a construction of users/entities formal relationships and may be derived from organizational charts 437, membership lists, identification of job positions, etc. The informal communities may be derived by clustering people/users/entities together who may have similar evolving needs or interests. One means of doing this may be use of the Content-Time-Community (CTC) model 439. The CTC model 439 may use the facts that each user is a probability distribution over various communities at a point in time, each community is a probability distribution over topics at a point in time, and each topic is a probability distribution over words. These probabilities may be nested to give a time dependent assessment of various user's/entity's inclusion in various informal communities or groups. These community construction aspects of the invention will be described in more detail below.

Any and all of the features generated by the content analysis 415, dynamic pattern analysis 425, and community construction 435 may be provided to a time-sensitive Adaboost 445. The time-sensitive Adaboost 445 may use adaptive user models 446 at both an individual user/entity level 447 and/or a community level 448. For example, the time-sensitive Adaboost 445 may assign larger weight to more recent data and smaller weight to older data to indicate the different data's relative importance. The time-sensitive Adaboost 445 will be described in more detail below.

A filtering/prediction 455 may receive the output of the time-sensitive Adaboost 445, and use it for various applications 456. For example, the system(s) and method(s) may be applied to a data set(s) to provide a personalized recommendation 457. One example may be the personalized recommendation to a user/entity of various documents identified or maintained in the data set. Another example may be providing a prediction of what a user/entity will like 458. For example, a user/entity may like a particular product or service that is being offered for sale or is available that has been identified by the information contained within the data set 405. As noted above, numerous applications of the invention are possible and a prediction may be provided for any number of subject matters.

Figure 5:
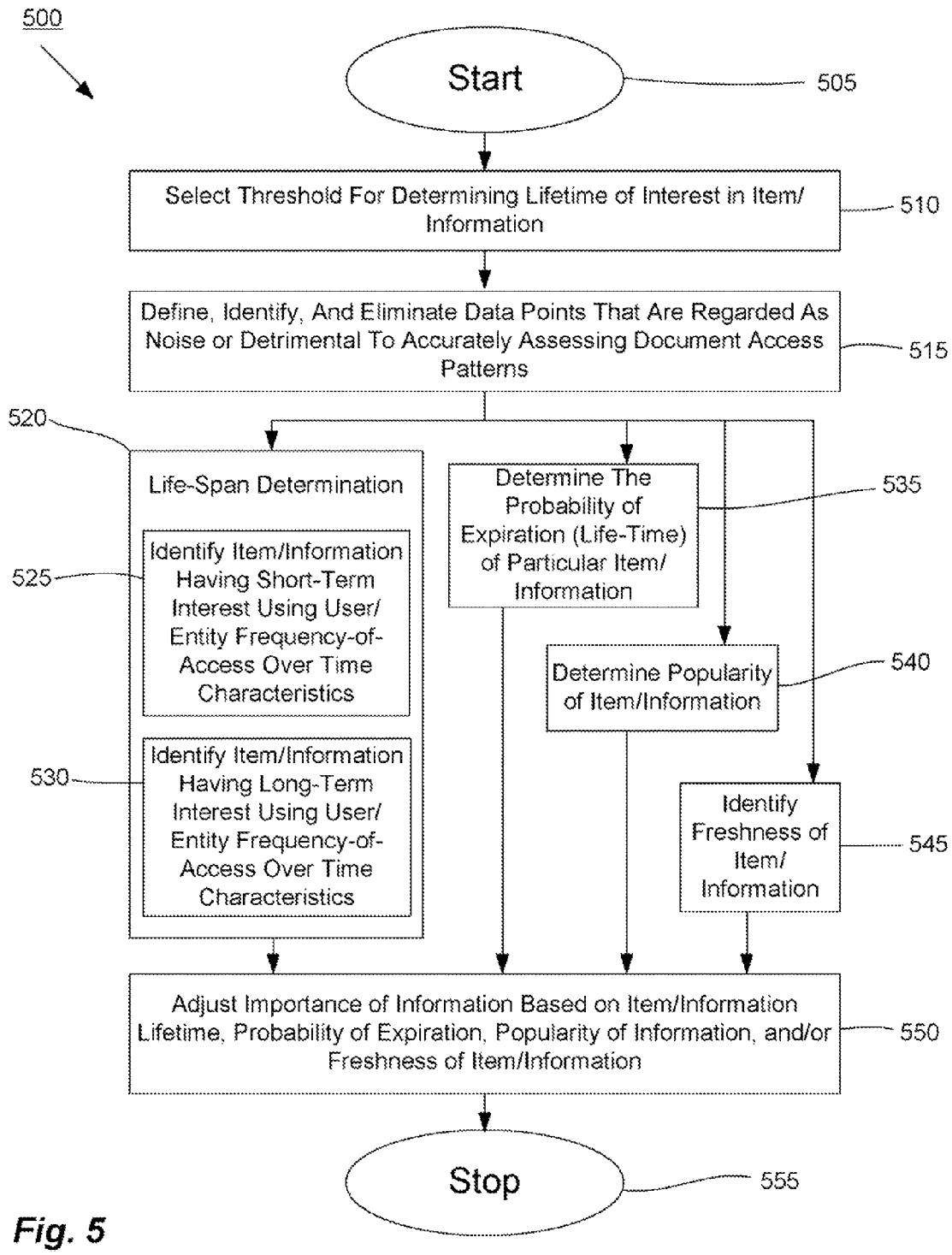
FIG. 5 is an exemplary overview of dynamic pattern analysis for item(s)/information(s) being analyzed, according to at least one embodiment.

Referring to FIG. 5, a more detailed exemplary overview of one possible dynamic pattern analysis process 500 for item(s)/information(s) being analyzed is provided, according to at least one embodiment of the present invention. At step 505 the process may start, for example, by a user/entity accessing information or requesting information. At step 510, a threshold may be selected for determining life time of interest of an item/information. For example, a one year time threshold may be set for a period of time in which the assessing activity on an item or document may be analyzed or a percent of accessing in a period. Then, at step 515, data points that are regarded as noise or detrimental to accurately assessing document access patterns may be defined, identified, and eliminated from the data so as to not interfere with an accurate classification of the data. Next, any one or all of steps 520, 525, 530, 535, 540, and/or 545 may be performed. For example, at step 520, a life-span determination may be performed. Step 525 may be performed, and the process may identify item(s)/information having short-term interest by using user/entity frequency-of-access over time characteristics. Step 530 may be performed, and the process may identify item(s)/information having long-term interest by using user/entity frequency-of-access over time characteristics. Determining an item's life-span will be explained in more detail below. At step 535, the probability of expiration (e.g., lifetime) may be determined for particular item(s)/information of interest using, for example, the threshold developed in step 510. At step 540, the popularity of particular item(s)/information of interest may be determined. At step 545, the freshness of particular item(s)/information may be identified. In any case, then at step 550, the importance of item(s)/information may be adjusted by, for example, different weighting of the characteristics based on item(s)/information life time, probability of expiration, popularity, and/or freshness. At step

555, the process may stop. A more detailed explanation for various aspects of these steps follows.

To better understand the operation of the dynamic pattern analysis of the present invention, it will be helpful to discuss some of the various characteristics of the analysis with the assistance of test data. So, a dataset collected from NEC's "EigyoRyoku 21" (denoted as ER and stands for Sales-Force in Japanese) system is selected as a representative data set. The ER system is a knowledgebase to support the NEC sales staff with registered documents. Users can search, preview, download, edit or provide feedbacks on the documents in the system. A set of recommended documents may be manually selected for all users. A one-year period of click stream logs was collected from April 2004 to March 2005 covering over 30,000 users and over 20,000 documents. Included in the dataset are users' demographic information, and the authors, titles, abstracts, and disclosure timestamps of the documents. Nine user actions are identified: {"Login", "Register_Feedback", "Preview", "Abstract", "Document Download", "Search", "Register", "Update", "Delete"}. The click stream log may be partitioned into sessions that start as "login" and then represent a collection of ordered sequences of user actions and may become part of log files. The documents in the system are heterogeneous, e.g., including short-term documents such as announcements, and long-term documents such as technical manuals. For testing purposes herein, it may be assume that if a user downloads a document, he or she is interested in that document.

Applying a dynamic pattern analysis to this data set, it may be explored what dynamic patterns exist in both user's behaviors and documents, and understand how they affect the personalized recommendations. Consider the document access patterns. First, all the available documents from the ER database between April 2004 and March 2005 are collected, and the expected useful life-time of each document in the ER database is estimated. The life-time of a document may be defined, for example, as the time period when 90% of the downloading behavior occurred. However, the data set may need to be cleaned up a bit so that the results are not skewed from including irrelevant or erroneous data (e.g., step 515). So, first of all, all weekends and holidays may be removed from the database. In total, 241 days were left as the valid working days. People's/user's self-downloading behavior and system administrator's downloading behaviors are regarded as noise and also removed from the statistics.

Figure 6A:
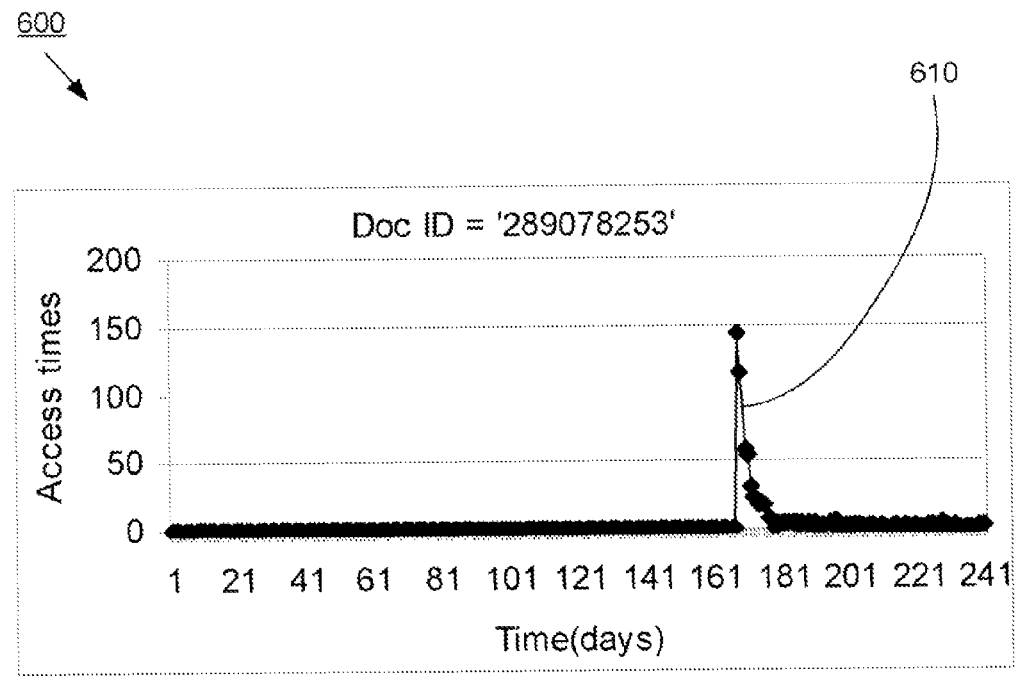
FIGS. 6a and 6b are exemplary lifetime histograms for two documents illustrating one possible difference between short term and long term item access types, according to at least one embodiment.
Figure 6B:
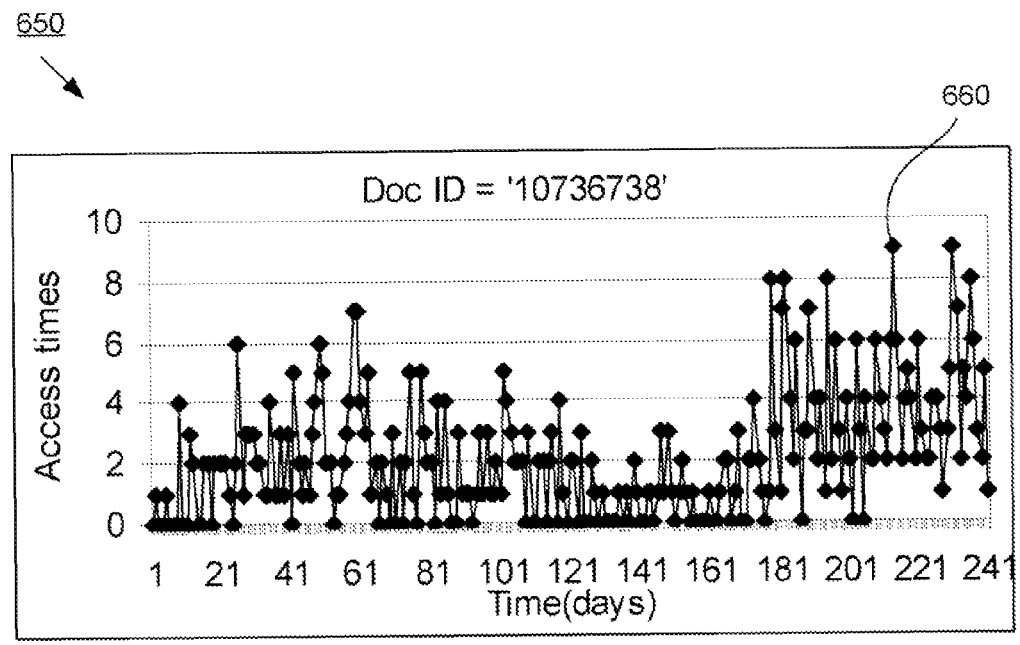

Based on this data, a number of studies were performed. In one study, two types of downloading patterns were found to exist in the data set. These downloading patterns may give indications of an item (e.g., document) life-span. The life-span histograms 600 and 650 of two documents' life-span are illustrated in FIGS. 6*a* and 6*b*, respectively. These two figures show how the number of accesses of specific documents may change over time. FIG. 6*a* clearly shows the trend of a document with short-term interest. A spike 610 in the access histogram 600 is achieved on the first day when this document is disclosed (at approximately day 161 within 241 days of data), and then quickly drops down to 0 and nobody touches it any more after 15 working days. This particular document may be classified as a "short-term" document. For the other type of document access showing in FIG. 6*b*, the histogram 650 shows that people have a continuous interest (albeit a lower number of accesses per day than the peak of the first document illustrated in FIG. 6*a*) on this document during the whole year. For example, at approximately day 195, this document was accessed 8 times (660) by various users. As a result of the continued interest in this document across or 241 day period, this document may be classified as a "long-term" document.

Figure 7A:
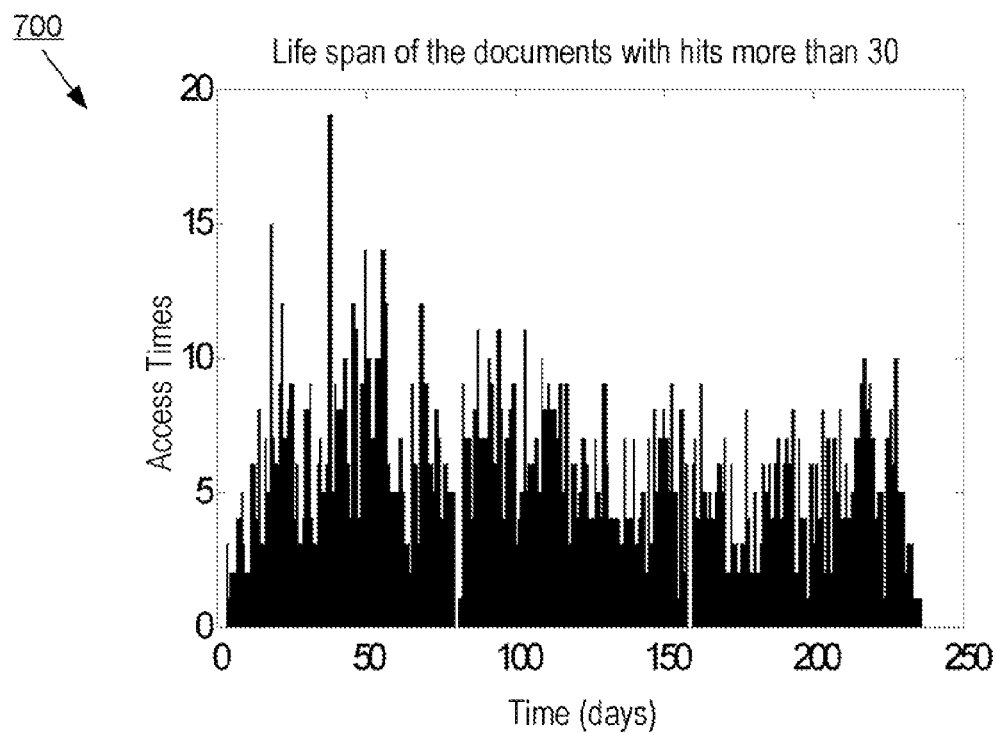
FIGS. 7a and 7b are exemplary distributions of the lifespan of documents (item(s)/information(s)) showing the clustering of the documents into short term and long term access types, according to at least one embodiment.
Figure 7B:
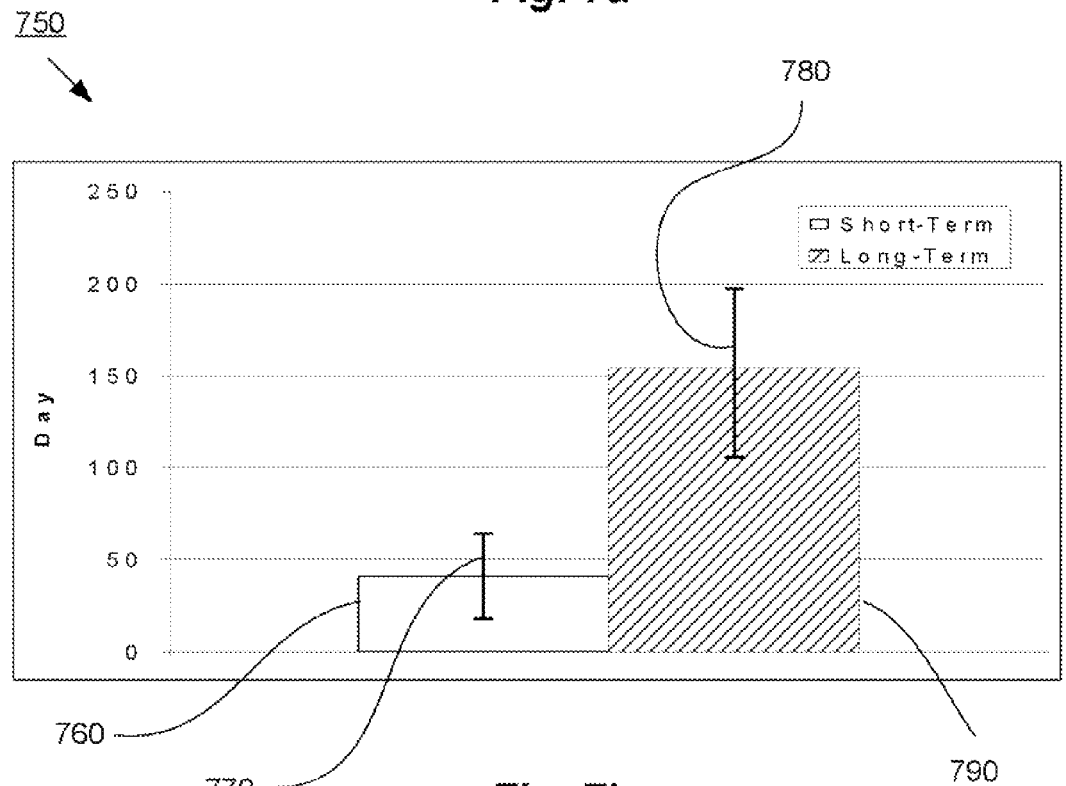

FIG. 7*a* illustrates the distribution of documents' life-span 700. By applying a Gaussian Mixture Model on the life-spans of documents, documents may be clustered into two groups. Gaussian Mixtures may be learned from the life-spans of documents. Then an estimate of the likelihood of each document belonging to each cluster and assign the documents into the cluster with the highest likelihood may be developed. The average life-spans of the two groups are 34.5 days (760) and 146.9 days (790), respectively, as shown in FIG. 7(*b*). For the ER test data, 54% of the documents may be categorized as short-term document, and 46% of the documents may be categorized as long-term documents. Also, range indicators 770 and 780 are provided showing the ranges for the short-term documents and long-term documents that were used for this exemplary data set. It was determined that documents belonging to the short-term type are mostly time-sensitive, e.g., conferences, keynotes, executive summaries, etc., and that documents belonging to the long-term type are mostly with continuing interest, e.g., handouts, specifications, reference documents, etc. Generally, short-term documents were related to news, which is interesting at the time it is discovered, but not typically interesting after a short time because the news merely becomes a fact relevant for only a short period of time. On the other hand, technical related documents usually have long time interests for people/users/entities because they are relevant for a longer period of time as reference material upon which people rely.

Turning now to document expiration date prediction, various methods may be used to predict when various documents have expired. Based on observation, it was concluded that one criteria may be that the longer no person/user/entity downloads a document, the less likely it is that the document may be downloaded in the future. Since this is a closed set (the maximum number of people accessing the documents is fixed), the more the people have already accessed a document, the less likely it will be accessed again. Noisy-or model from Bayesian Networks may be used in this case as one possible means to calculate the probability of a binary event with multiple possible causes. In the present invention, it may be used to estimate the probability of when a document will expire. In the noisy-or model, it may be assumed that an event can only happen if at least one of the causes occurred. It may also be assumed that the probability of any cause failing to trigger the event is independent of any other causes. Thus, the probability of one document being expired may be determined by:

$$P(e) = (1 - \exp(-\eta_1 \Delta t)) \cdot (1 - \exp(-\eta_2 \Delta u)) \qquad (1)$$

$$\Delta t = \begin{cases} t - thr_t & \text{if } t > thr_t \\ 0 & \text{others} \end{cases}$$

$$\Delta u = \begin{cases} u - thr_u & \text{if } u > thr_u \\ 0 & \text{others} \end{cases}$$

t measures how many days one document has not been downloaded, u measures how many users have downloaded the document, and the threshold $thr_t$ and $thr_u$ may be set to, for example, 15 and 100 in this case. During run-time, the probability of expirations may be regularly updated and estimated. All documents that have high expiration probabilities may be subsequently excluded from the recommendation candidate list.

Figure 8:
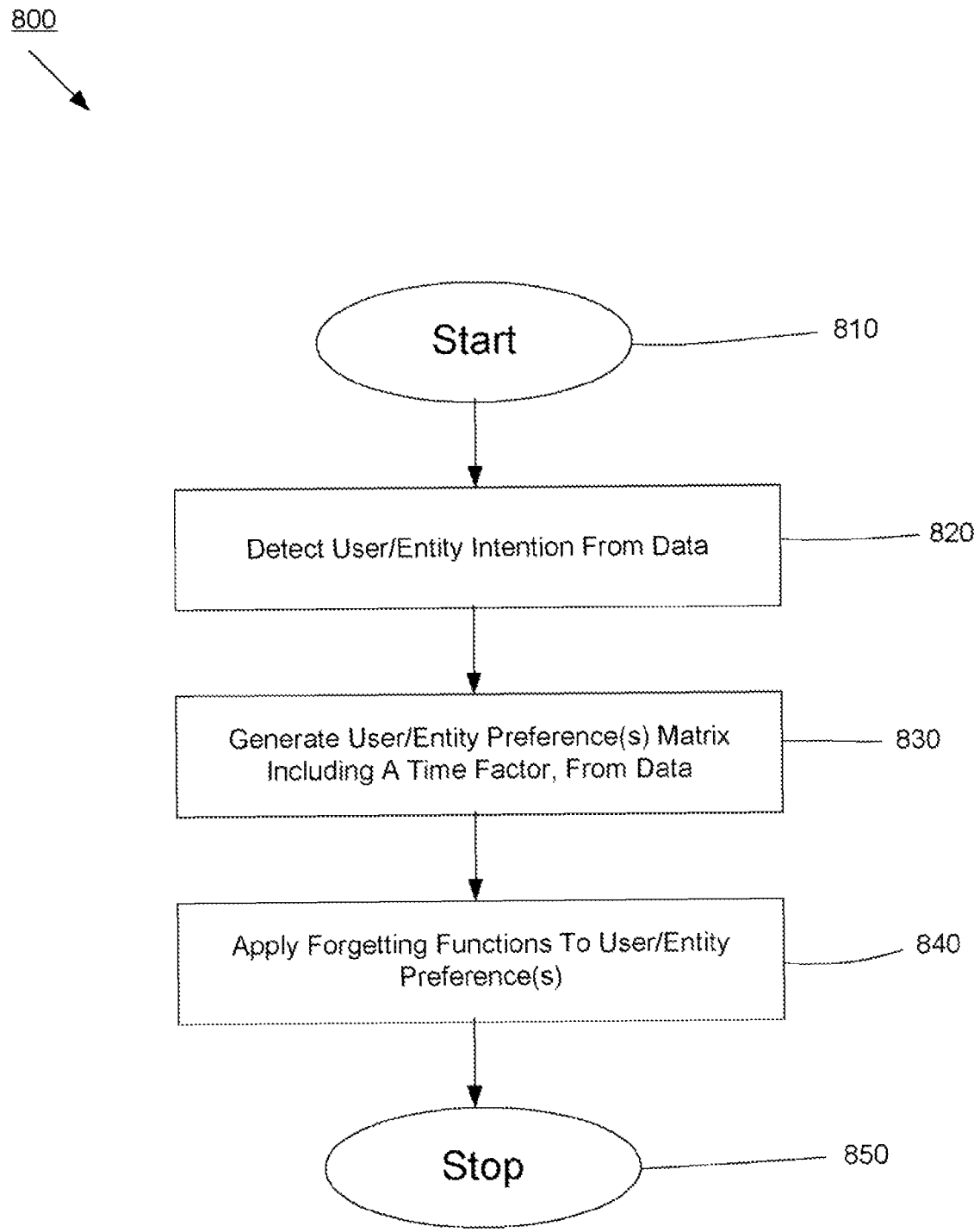
FIG. 8 is an exemplary overview of dynamic pattern analysis for users/entity(ies) being analyzed, according to at least one embodiment.

Referring to FIG. 8, an exemplary process 800 for dynamic pattern analysis for users/entity(ies) being analyzed is provided, according to at least one embodiment of the invention. The process may begin at start 810. At step 820, the user/entity intention may be detected from the data/information. For example, a user's/entity's intention may be inferred from the type of data or documents they access over time. At step 830, a user/entity preference matrix may be generated from the data/information and may include a time factor (See also FIG. 10). This matrix may be three dimensional and may indicate various changes in a user's/entity's preference or interest over time. At step 840, a forgetting function may be applied to user's/entity's preferences. For example, user's/entity's more recent preferences may be weighted more heavily to reflect their relatively high importance relative to user's/entity's older preferences. At step 850, the process may stop. Of course, steps 820-840 may be completed in any order.

Now a discussion of various user dynamics that may be derived from the ER test data. Users' dynamics may include many aspects: they may come and go from the system, their intentions may be different from each other, their preferences and interests may also change over time, etc. Here the test data helps show an example of how to capture users' intentions and the interest evolution.

People's intention of using the system can be different: some users/entities only access the data set for updating their knowledge of various information, then they will only read what's new i.e., mostly interested in "short-term" documents; some users/entities only access the data set for details of various informative materials, then they will search, look at abstracts and preview the documents, and finally download the documents i.e., more interested in "long-term" documents. If users'/entities' intention is known or can be predicted before they log into the system and access the data set, then recommendations may be improved by fitting their needs of, for example, short-term or long-term documents.

Figure 9:
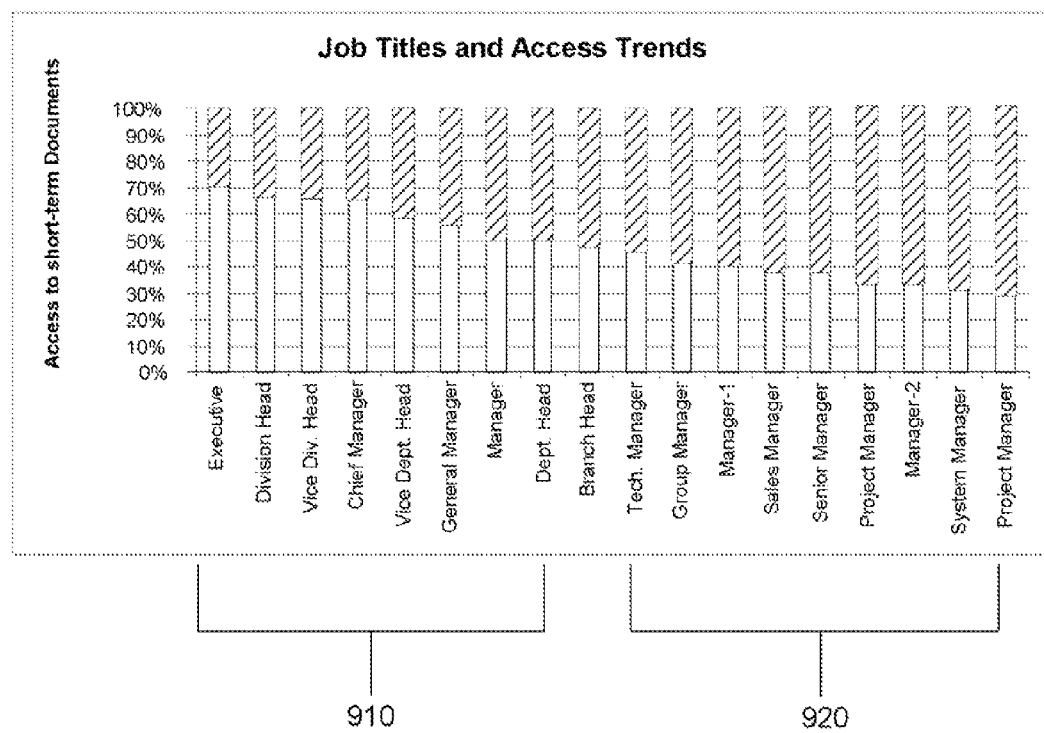
FIG. 9 is an exemplary distribution of job titles in relation to document access trends, according to at least one embodiment.

Based on the ER test data, the types of documents users touched or down-loaded, the probability of how much they like short-term documents as well long-term documents may be estimated. Referring to FIG. 9, a chart 900 showing correlation between the types of documents' people accessed and their job title can be seen. Interestingly, based on the ER test data the higher level managers 910 tend to have at least 50% or more of their accessing being of short-term documents, while other employees 920 tend to have a higher percentage access of long-term documents. As such, it may be possible to infer people's intention from the documents they accessed. In this case with the test data set, people's job titles are related to the types of documents they tend to download.

Figure 10:
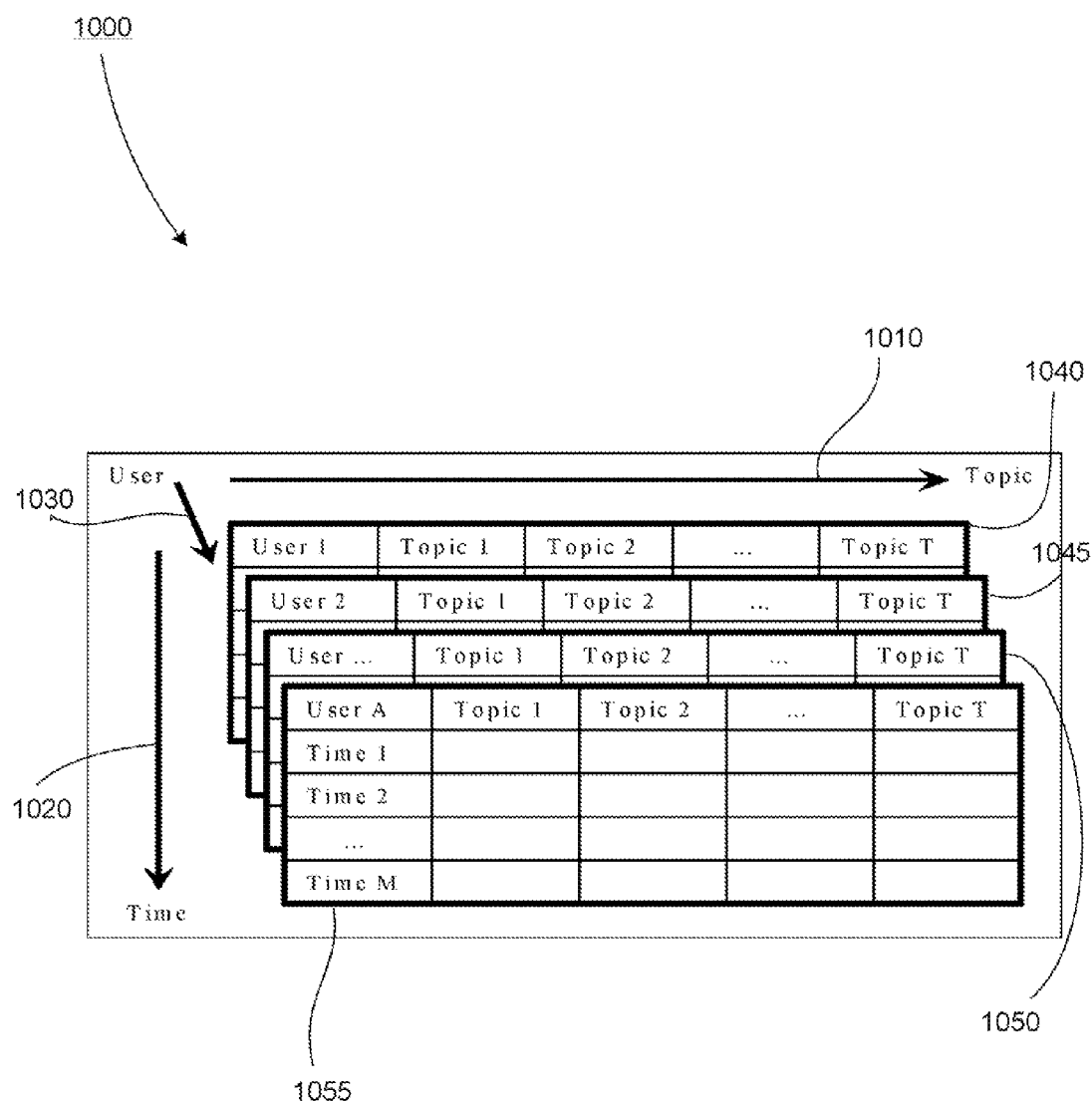
FIG. 10 is an exemplary illustration of an evolutionary user preference matrix, according to at least one embodiment.

Referring now to FIG. 10, an exemplary illustration of an evolutionary user preference matrix 1000 is provided, according to at least one embodiment of the present invention. Users' interests and preferences may be captured by the documents they touched or downloaded over time. This can be imagined as these preferences are recorded in an evolutionary preference matrix 1000. This is different from encoding users' interests as static (as may occur in the traditional collaborative filtering techniques). How the user's/entity's interests change over time may be recorded by extending a 2D user preference vector (user in one dimension and topic in another dimension) to 3D user preference matrix (including time). As such, the evolutionary preference matrix 1000 may include an X-axis 1010 of topic, a Y-axis 1020 of time t, and a Z-axis 1030 of user. Various matrices 1040, 1045, 1050, 1055, etc., for each user/entity may then include information on what topic the user/entity accessed at what time. Then the various matrices may be compared and matrices of users with similar evolutionary tastes may be collected together for determining and tracking dynamic changes in groups of users/entities.

It may be assumed that a user's/entity's preferences/interests do not typically change suddenly. Although the user/entity may not access the documents of the same topic continuously, the user's interests/preferences on the documents of one topic during one time period may keep contributing to his choices in the near future. This goal may be achieved by smoothing the evolutionary user matrices along the time axis. The invention may apply a sliding window with width C along the time axis to collect the preference for each unit in the evolutionary preference matrix. C could be by days, by months, or by half a year, etc.

A forgetting function may also be applied to the user's/entity's preferences/interests. A user's/entity's recent preferences/interests may be more important than their preferences of a long time ago, particularly for the user's/entity's current choices, selections, or needs. Thus, a forgetting function may be applied to the dynamic preferences matrix:

$$P(g \mid u, t) \propto \sum_{i=1}^{N} P(g \mid u, t_i) * (\exp(-\eta(t - t_i))) \qquad (2)$$

where $P(g|u,t)$ may indicate a user's cluster distribution at time t, and $t_i < t$, $\eta$ may be a forgetting parameter. Then a user's/entity's current preferences/interests may be indicated by the aggregated preferences of the history with a decay function denoting the different contributions.

Figure 11:
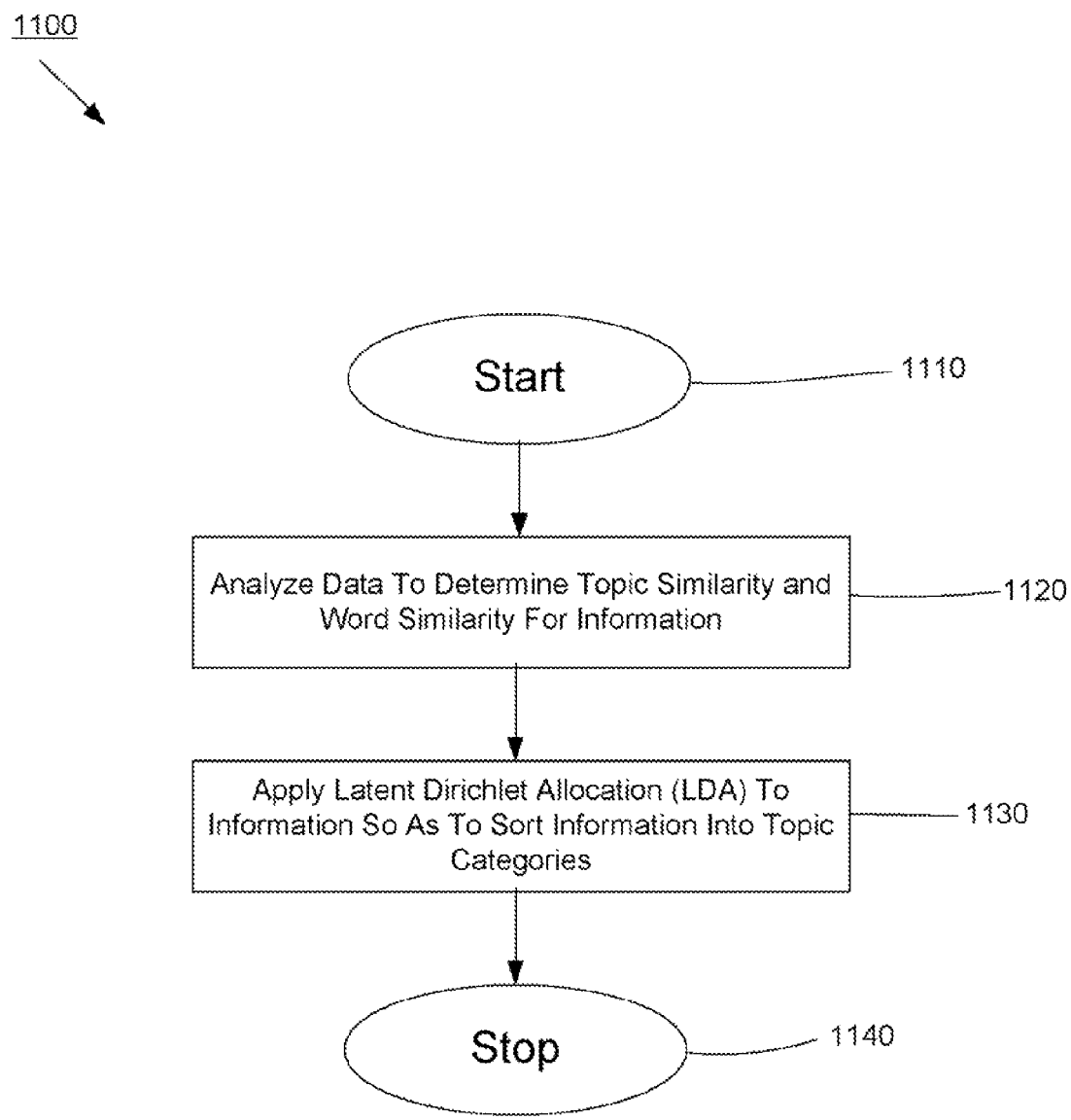
FIG. 11 is an exemplary process for content analysis, according to at least one embodiment.

Now an explanation of the content analysis process will be provided. Referring now to FIG. 11, an exemplary process 1100 for content analysis is provided, according to at least one embodiment of the present invention. The process may start at step 1110. At step 1120, data may be analyzed to determine topic similarity and word similarity for the data/information. At step 1130, a Latent Dirichlet Allocation (LDA) may be applied to information so as to sort information into topic categories. Steps 1120 and 1130 may be done in any order or simultaneously. At step 1140, the process may stop.

Figure 12:
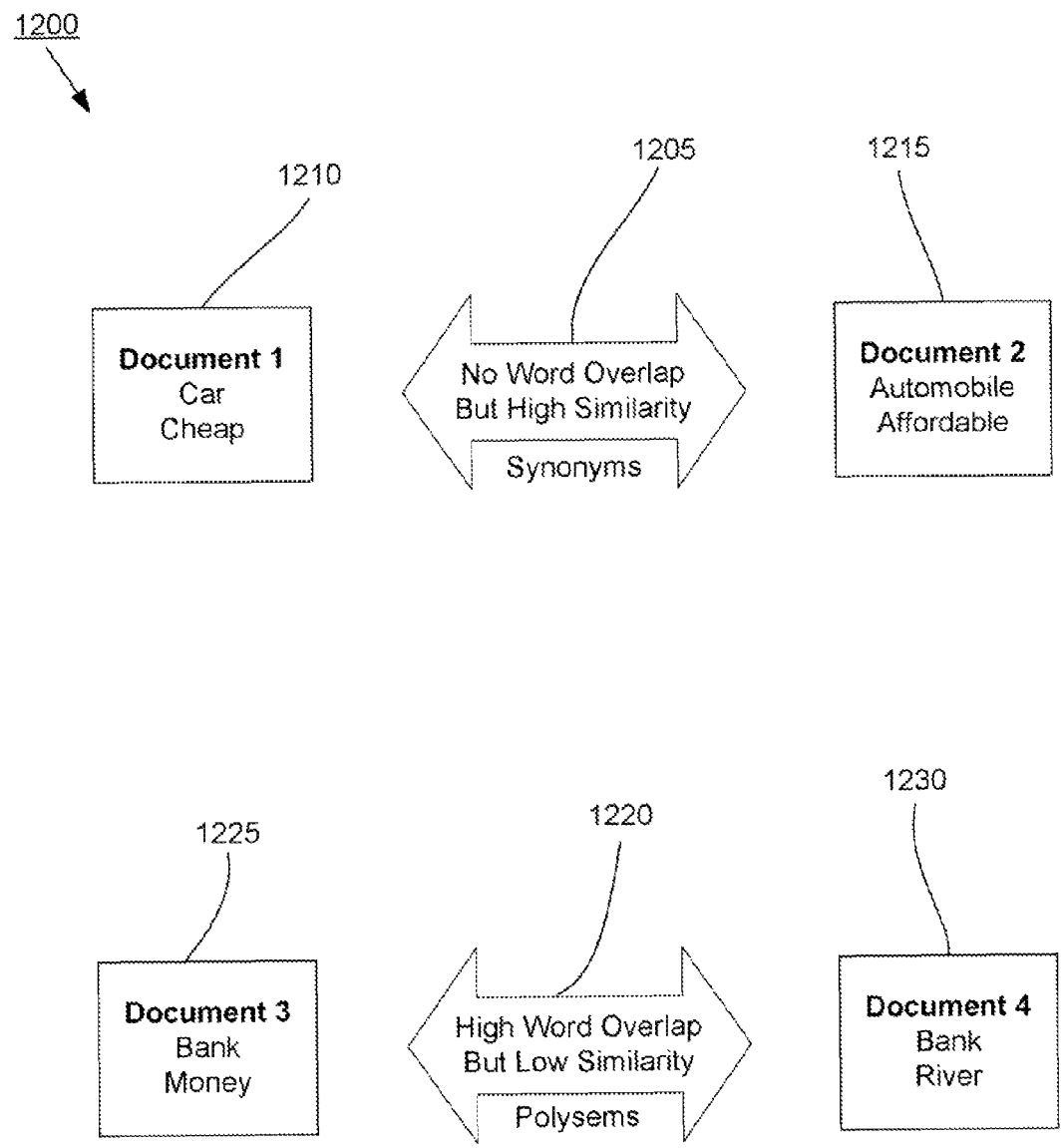
FIG. 12 is an exemplary illustration of some problems associated with assessing the similarity of documents based on raw word counts, according to at least one embodiment.

Referring now to FIG. 12, an exemplary illustration 1200 shows some of the problems associated with assessing the similarity of documents based on raw word counts, according to at least one embodiment of the present invention. Assessing the similarity of documents based on purely word counts can be misleading. Often different words in the English language may have the same meaning (i.e., synonyms). For example, the words auto, automobile, car, motor vehicle, etc., may be used to refer to the same topic. As illustrated, document 1 (1210) may include the words "car" and "cheap." A document 2 (1215) may include words "automobile" and "affordable." As can be appreciated, document 1 and document 2 should be identified as being of a related topic and having high similarity. However, there is no word overlap. Therefore, based on simply a word count document 1 and document 2 would not be considered related to the same topic.

Also, the same word in the English language may have multiple meanings (i.e., polysems). For example, the word "bank" may be used to refer to a place that manages money or the land that abuts to the water in a lake, river or ocean. As illustrated, document 3 (1225) may include the words "bank" and "money." A document 4 (1230) may include the words "bank" and "river." In this case, document 3 and document 4 both contain the word "bank" but these documents do not likely have any similarity because the word "bank" has a different meaning in document 3 and document 4, and thus they should not be related to one another. However, based on a simple word count or matching, document 3 and document 4 might be considered related. Therefore, the conceptual dimension must be considered to properly relate documents having the same or similar topics instead of just words matching.

Figure 13:
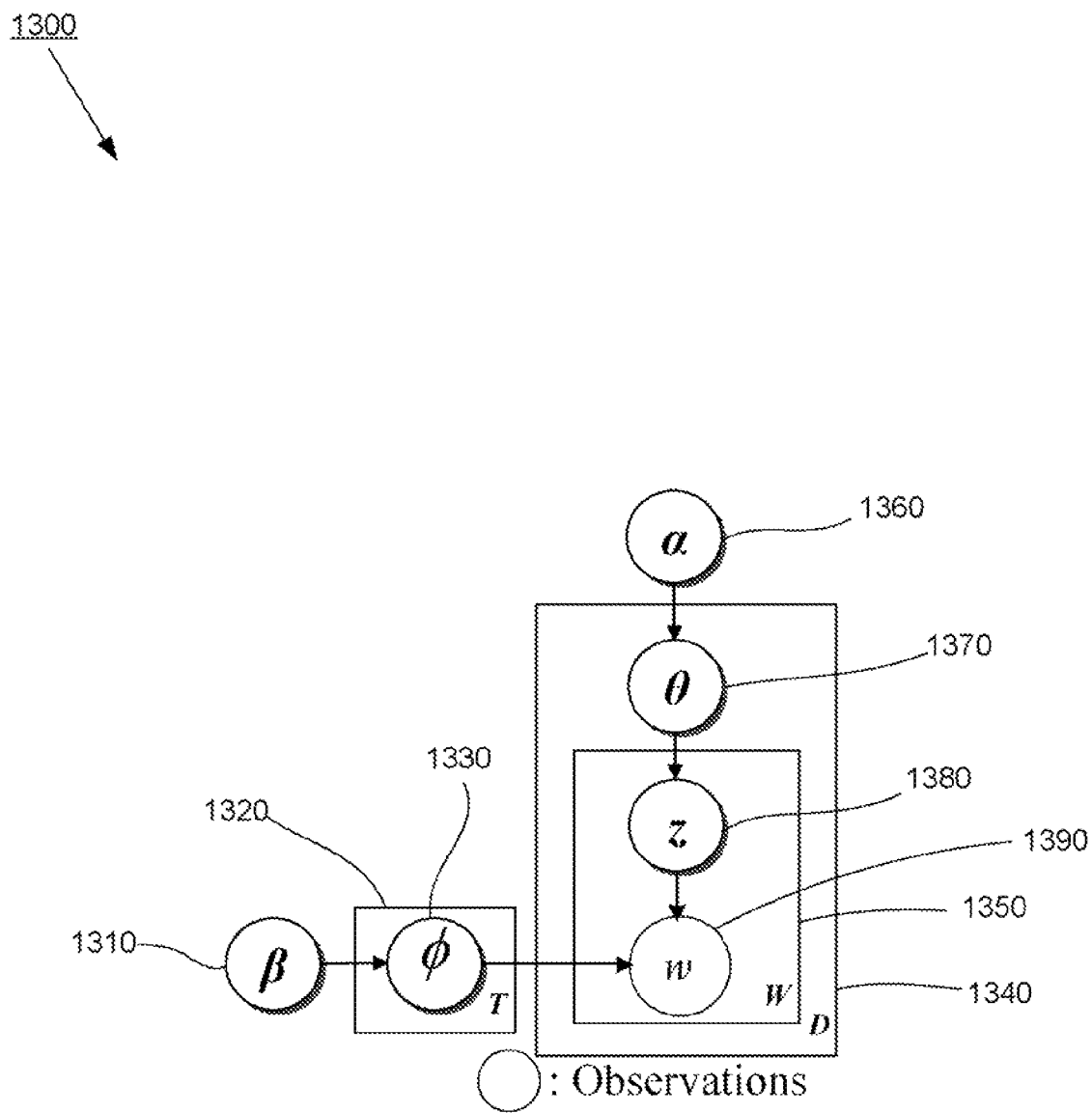
FIG. 13 is an exemplary Latent Dirichlet Allocation (LDA) procedure that may be used in content analysis to, for example, categorize documents into topics, according to at least one embodiment.

Referring now to FIG. 13, an exemplary Latent Dirichlet Allocation (LDA) procedure 1300 that may be used in content analysis to, for example, categorize documents into topics is provided, according to at least one embodiment of the present invention. One goal of using the LDA procedure 1300 is to categorize the various items such as documents into topics. Each document is a probability distribution over the various topics. As such, mixture weights may be given for the probability of a particular document(s) having words that relate to a given topic(s). Each topic is a probability distribution over words. As such, mixture components may be given for the probability of a given word being indicative of a given topic. The probability of the ith word in a given document is given by:

$$P(w_i) = \sum_{j=1}^{T} P(w_i | z_i = j) P(z_i = j) \quad (3)$$

where $w_i$ may include a mixture component and $z_i$ may include mixture weights.

mixture weight $(\theta_j^{(d)})$ mixture components $(\phi_w^{(j)})$ where $z_i$ is a latent variable indicating the topic from which the ith word was drawn and $P(w_i|z_i=j)$ is the probability of the word $w_i$ under the jth topic. $P(z_i=j)$ gives the probability of choosing a word from topics j in the current document, which varies across different documents. In LDA, a distribution over topics is sampled from a Dirichlet distribution for each document. Each word is sampled from a multinomial distribution over words specific to the sampled topic. In LDA, D documents containing T topics expressed over W unique words, P(w|z) with a set of T multinomial distributions $\phi$ over the W words, can be represented such that $P(w|z=j)=\phi_j^{(w)}$, and P(z) with a set of D multinomial distribution $\theta$ over the T topics, such that for a word in document d, $P(z=j)=\theta_j^{(d)}$. This LDA technique may thus be used to help determine if various items or documents should be grouped together into a particular category or topic.

Figure 14:
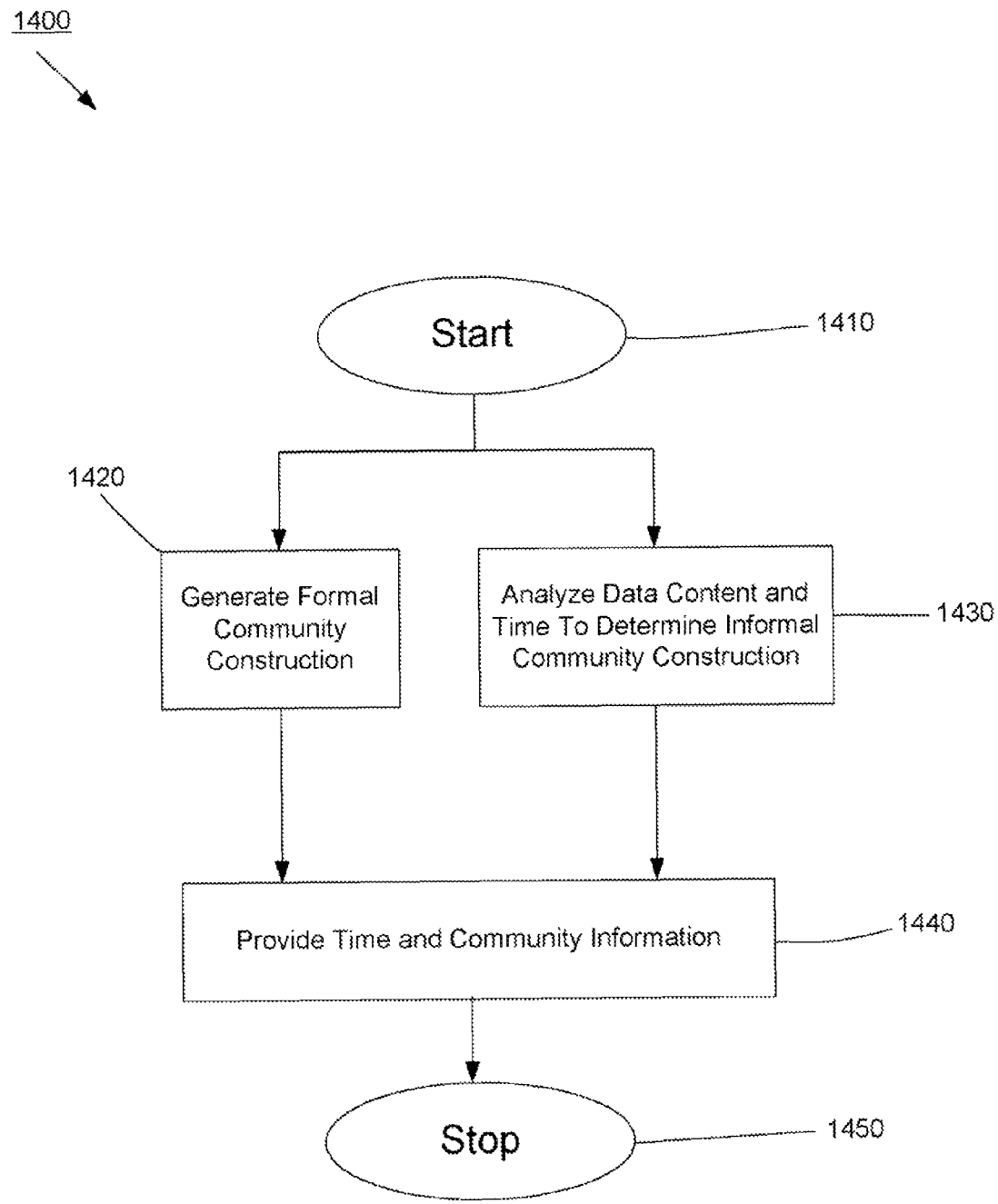
FIG. 14 is an exemplary overview of community construction including informal communities and formal communities, according to at least one embodiment.

Referring now to FIG. 14, an exemplary flow chart for a community construction including informal communities and formal communities is provided, according to at least one embodiment of the present invention. At step 1410, the process of constructive communities may start. At step 1420, a formal community construction for the various users/entities may be generated. A formal community may be constructed from, for example, an organization chart for a company or group, a membership list for a group, an email distribution list for a group, etc., including any formal association between people/users/entities. Intuitively, people from the same department of the same company may tend to have similar interests of various documents, since they often are collaborating on the same or similar projects and/or objectives. Constructing the formal community from an organization chart provides one kind of community construction method for the ER test data set and analysis of document use. The people in the ER test data may be partitioned into the levels of the organization hierarchy, which on average may include ten to one hundred people, for formal communities. To further investigate this point, a co-touching network may be built based upon the formal communities and the connectivity may be monitored when the test data is applied to see now the connectivity may evolve over time.

At step 1430, data content and time may be analyzed to determine an informal community construction. Informal communities may be constructed from people with similar interests or preferences. Based on the ER test data set used herein, each person may have a set of documents he touched of downloaded, at the same time, a document includes a set of terms. As a result, the relationship may be comprised of a three-level relationship: people-document-term. A three-way aspect model may be used to tackle the three-way co-occurrence data among users, documents, and document content. In addition, the variation of these terms over time leads to a more complex analysis. Thus, in various embodiments, a Content-Time-Community (CTC) model may be used for constructing informal communities based on people's evolving interests and preferences. In any case, at step 1440 time and community information is provided. At step 1450 the process stops.

Figure 15:
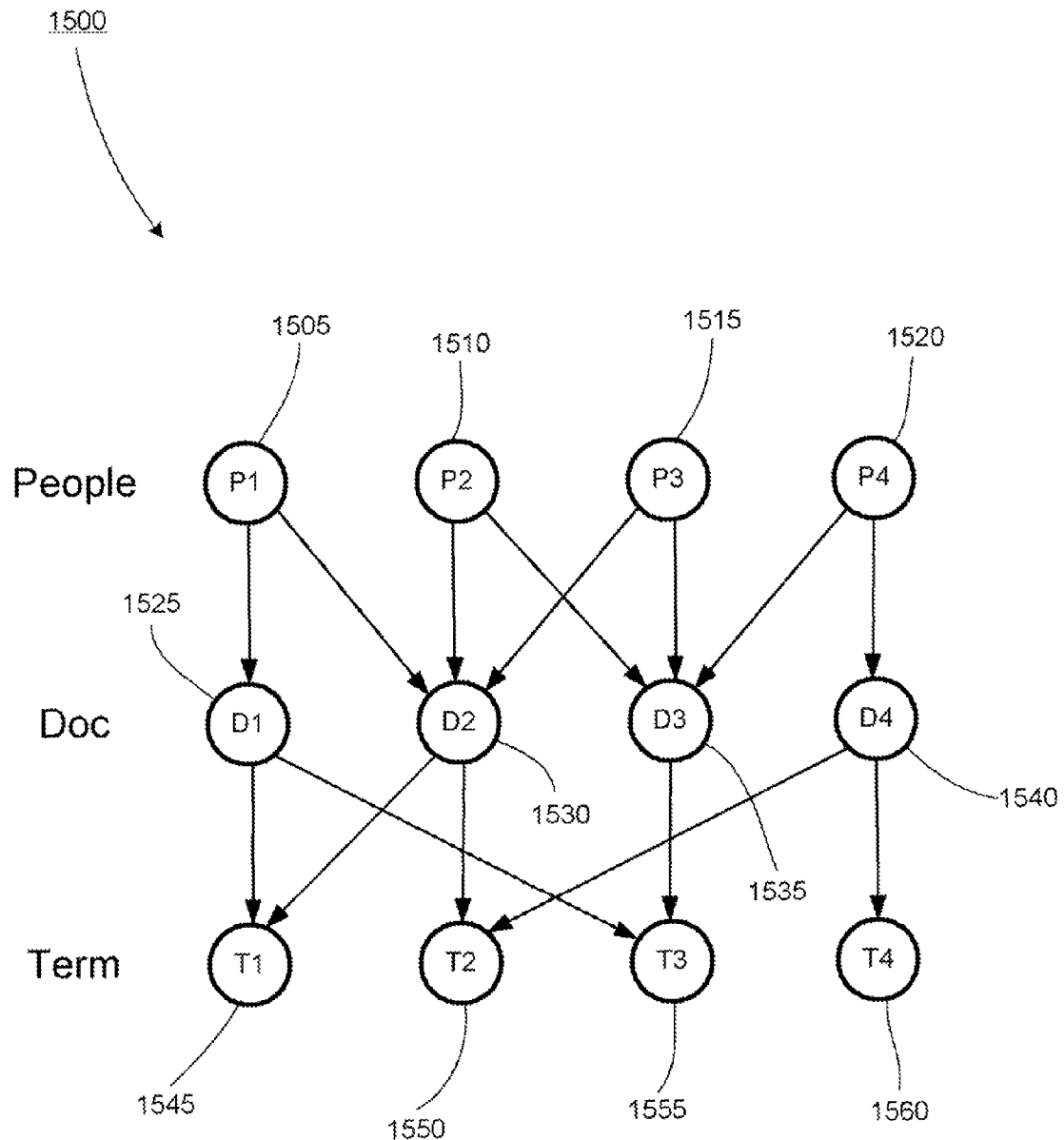
FIG. 15 is an exemplary illustration of the relationship between people, documents, and terms, upon which community construction may be based, according to at least one embodiment.

Referring to FIG. 15, an exemplary illustration of the relationship between people, documents, and terms, are provided upon which community construction may be based, according to at least one embodiment of the present invention. The network 1500 of FIG. 15 illustrates a generative process of the CTC model. A plurality of people (users/entities) are provided as P1 (1505), P2 (1510), P3 (1515), P4 (1520) through Pn (not shown) are provided along with their interrelationship with various documents D1 (1525), D2 (1530), D3 (1535), D4 (1540) through Dn (not shown) are illustrated by vectors interconnecting various people with various documents. Terms T1 (1545), T2 (1550), T3 (1555), T4 (1560) through Tn (not shown) are provided and their interrelationship with the various documents are shown by vectors from particular documents to particular terms. This exemplary network may be constructed by the CTC to model the people-document-term relationship. A time aspect dimension may be added as described below.

Figure 16:
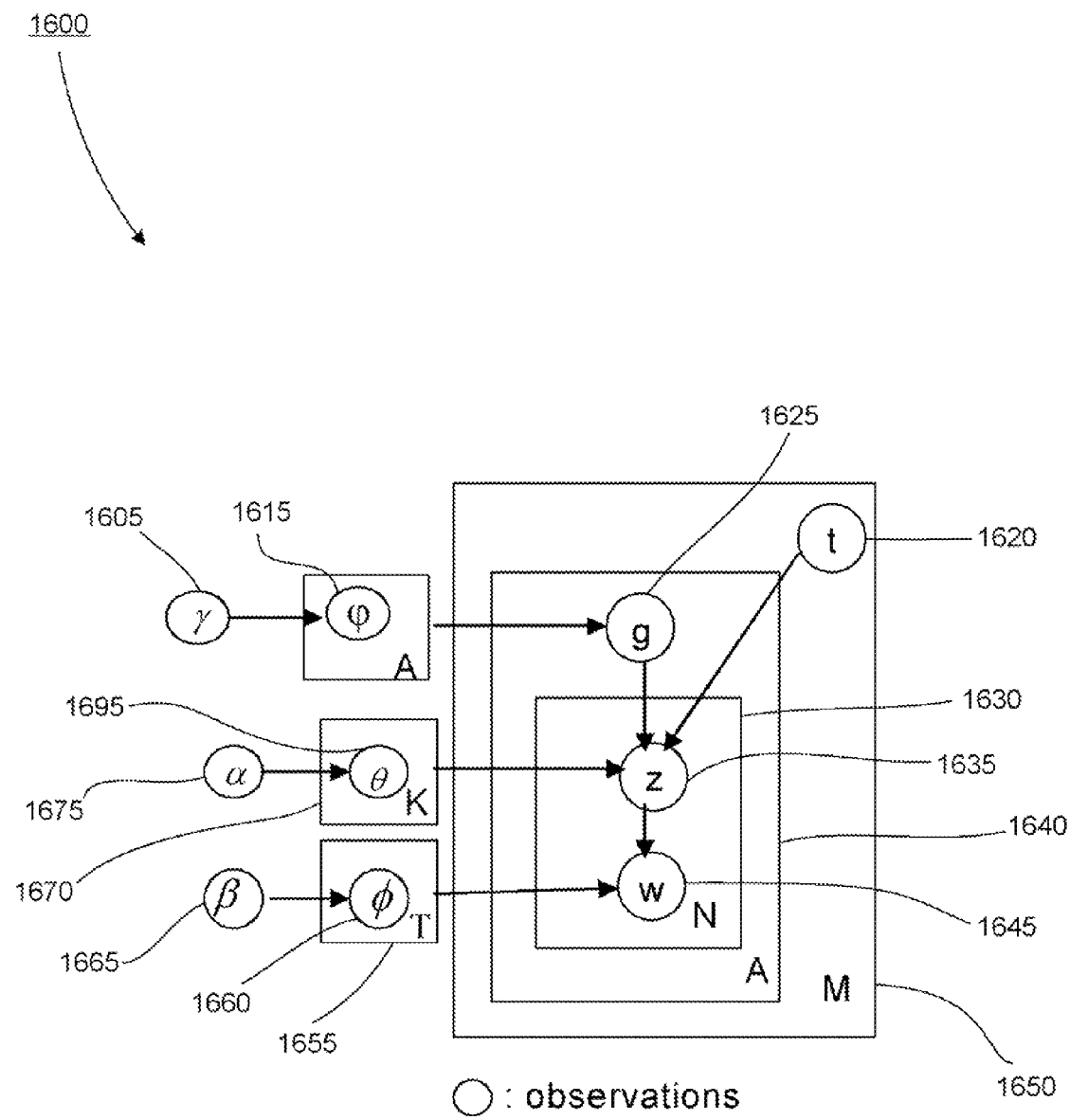
FIG. 16 is an exemplary block diagram for a Content-Time-Community model, according to at least one embodiment.

Referring now to FIG. 16, an exemplary overview of the generative process of a Content-Time-Community model is provided, according to at least one embodiment of the present invention. In this case, a four-way aspect model has been developed to handle the four-way co-occurrence data among users, documents, document content (topics, terms or words) and time (e.g., people-document-term-time). The informal communities investigated for this invention are for people with similar evolving interests or preferences. Generally, each person may have a set of documents he or she downloaded. Each document may contain a set of terms (e.g., words, topics, etc.). As a result, these comprise of a three-level relationship: people-document-term. However, time may also be considered, thus resulting in the four-level relationship: people-document-term-time, which will be modeled using the CTC model. The CTC may be used for user community clustering and may also be based on the framework of the Latent Dirichlet Allocation model (LDA).

FIG. 16 illustrates the generative process 1600 of the CTC and the variables are as follows. The term w (1645) may represent words. The term z (1635) may represent latent topics. The term g (1625) may represent latent groups. The term N (1630) may represent the number of words in a document. The term A (1640) may represent the number of users. The term M (1650) may represent the number of time periods.

The term T (1655) may represent the number of latent topics. The term K (1670) may represent the number of latent groups. The terms θ (1695), φ (1660), and φ (1615) may be the parameters we want to estimate with the hyperparameters α (1675), β (1665), and γ (1605), where φ may be the probability of a word given a topic. The term θ (1695) may be the probability of a topic given a user cluster. And the term φ (1615) may be the probability of a user cluster given a user. The term t (1620) may represent the time period(s).

Assume that documents may be represented as random mixtures over latent topics, where a topic may be characterized by a distribution over words; people may be represented as random mixtures over latent groups, where a group may be characterized by a distribution over topics that are downloaded by this group of people. Then, given T topics and K groups of people, the probability of the i-th word in a given document appearing in time $t_i$ may be formalized as:

$$P(w_i) = \sum_{j=1}^{T} \sum_{k=1}^{K} \sum_{l=1}^{M} P(w_i | z_i = j) * P(z_i = j | g_j = k, t_l = m) * P(g_j = k, t_l = m) \quad (4)$$

where $w_i$ may represents the i-th word, $z_i$ may be a latent variable indicating the topic from which the i-th word was drawn, $g_j$ may be a latent variable indicating the group from which the j-th user was drawn, N may be the number of words in a document, A may be the number of users, M may be the number of time periods, T may be the number of latent topics, and K may be the number of latent groups. When M may be set to 1, this model may be to estimate user groups and document topics without regard to the time factor. When M is set to be larger than 1, users' evolving interests and preferences may be captured. Words $w_i$ in documents that the users downloaded in the time period t may be observed variables. Latent variables may include z and g, indicating latent topics and user clusters, respectively. Each user cluster (from a set of K clusters) may be associated with a multinomial distribution over topics, represented by φ. Each topic may be associated with a multinomial distribution over words, represented by φ. The multinomial distributions φ, θ, and φ may have symmetric Dirichlet priors with hyperparameters γ, α, and β as shown in Eq. (5) below.

$$w_i | z_i, \phi^{(z_i)} \sim Discrete(\phi^{(z_i)}) \quad (5)$$
$$\phi \sim Dirichlet(\beta)$$
$$z_i | g_j, \theta^{(g_j)} \sim Discrete(\theta^{(g_j)})$$
$$\theta \sim Dirichlet(\alpha)$$
$$g_j | \varphi^{(u_j)} \sim Discrete(\varphi^{(u_j)})$$
$$\varphi \sim Dirichlet(\gamma)$$

By using, for example, a Gibbs Sampling process (see, e.g., T. Griffiths and M. Steyvers, Finding Scientific Topics, Proc. of the Natil. Academy of Sciences, 5228-5235, 2004) we may construct a Markov chain that converges to the posterior distribution on z and g, and then use the results to infer φ, θ, and φ.

$$\varphi_{ak} = P(g | u) = \frac{C_{ak}^{AK} + \gamma}{\sum_{j=1}^{K} C_{aj}^{AK} + K\gamma}, \quad (6)$$

$$\theta_{an} = P(z | u) = \frac{C_{an}^{AT} + \alpha}{\sum_{j=1}^{T} C_{aj}^{AT} + A\alpha}$$

$$\phi_{wn} = P(z | w) = \frac{C_{wn}^{WT} + \beta}{\sum_{j=1}^{W} C_{jn}^{WT} + W\beta}$$

where $C_{wn}^{WT}$ may be the number of times word w may be assigned to topic n, not including the current instance, $C_{an}^{AT}$ may be the number of times user a selects topic n, not including the current instance, and $C_{ak}^{AK}$ may be the number of times user a is assigned to group k, not including the current instance. With these Dirichlet parameters, we may iteratively cluster the user-content-time data pairs to generate the user communities and content topics z, which may be done simultaneously. The results may be soft clustering that indicates the confidence values of a person belonging to a community and a document belonging to a topic. Then each user may be clustered into an informal community based on $$g_u = \arg\max_{g} P(g | u).$$

Figure 17:
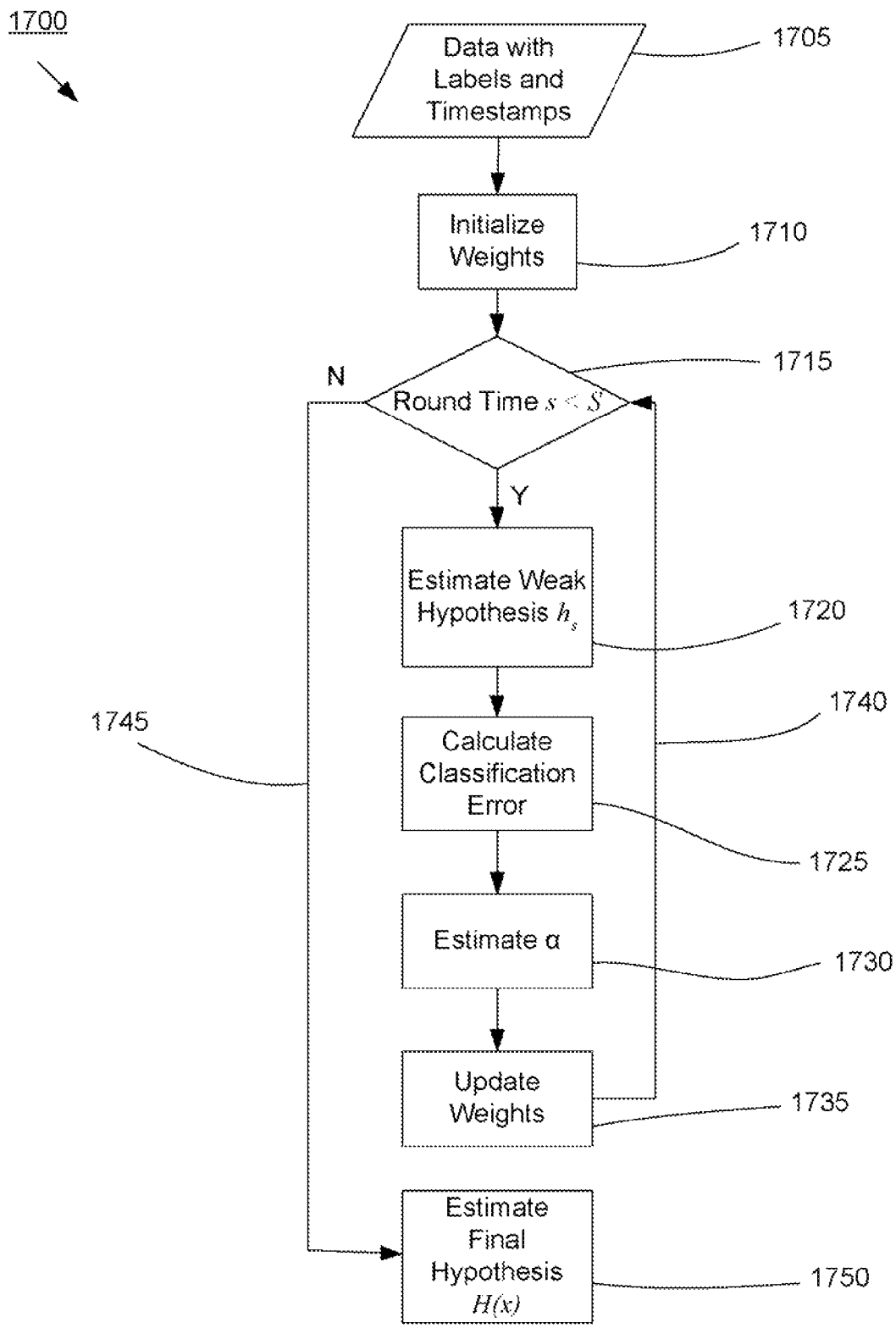
FIG. 17 is an exemplary time-sensitive adaptive modeling process, according to at least one embodiment.

Now we will turn to the construction of an adaptive user model that takes output from the content analyzer/analysis, dynamic pattern analyzer/analysis, and/or the community constructor/construction and helps determine what items (e.g., documents) user(s)/entity(ies) will be interested in knowing about. Referring to FIG. 17, an exemplary time-sensitive Adaboost procedure or process flow is provided, according to at least one embodiment of the present invention. Various dynamic feature may be input into the time-sensitive Adaboost process. At step 1705, data with, for example, labels and timestamps may be provided to the process. Next, at step 1710, various weights may be initialized. For example, a weighting for a current weak hypothesis may be set. The more recent data may get a higher weight. Then, at decision step 1715, it may be determined if round time s<S, where s may be the current iteration step and S may be the total steps that are allowed. If yes, then at step 1720 an estimate of weak hypothesis $h_s$ may be developed. Then, at step 1725, a calculation classification error may be developed. Next, at step 1730, an estimate for weight α is developed. Then, at step 1735, the weights are updated and the process returns to decision step 1715 via return path 1740. This process will continue until s is no longer <S. When that occurs, the process proceeds to step 1750 and an estimate of the final hypothesis H(x) may be provided. In this way, more recent behavior may be more heavily weighted in providing a prediction of the future. The output may be a score to indicating how likely an item is of interests of the user. A more detailed description of the time-sensitive Adaboost process will be provided below when explaining the community-based dynamic recommendation system(s) and method(s) in detail.

Figure 18:
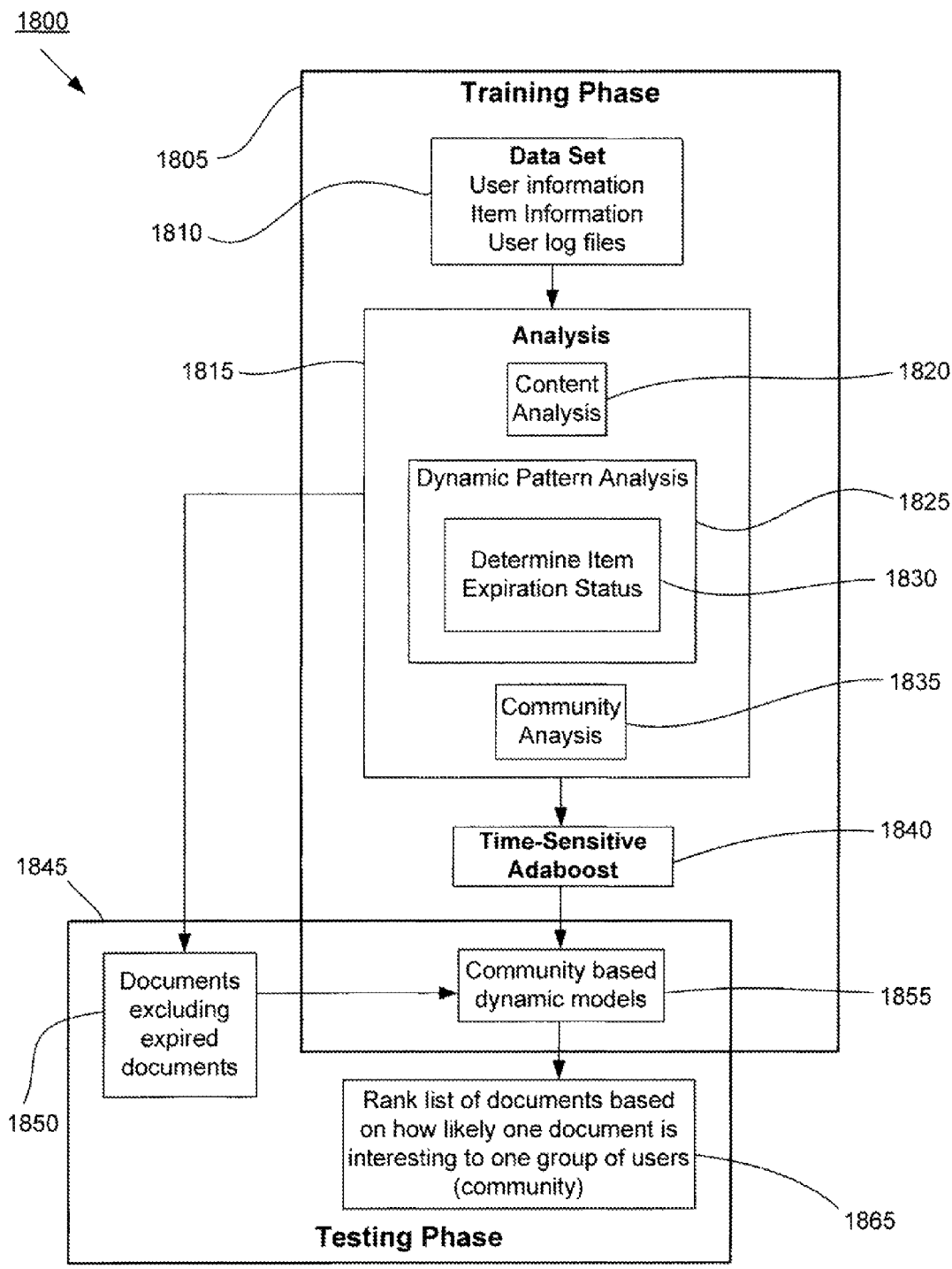
FIG. 18 is an exemplary overview of a Community-Based Dynamic Recommendation procedure including a training phase and a testing phase, according to at least one embodiment.

In the following few paragraphs, the proposed Community-Based Dynamic Recommendation (CBDR) system(s) and method(s) will be described, including its components, how to infer user implicit preference, how to extract the features for representing users' interests and preferences, and how to fuse these features for discerning user interests using, for example, the time-sensitive Adaboost. Referring now to FIG. 18, an exemplary overview of a Community-Based Dynamic Recommendation procedure 1800 is provided, according to at least one embodiment of the present invention. In the training phase 1805, a data set 1810 may be accessed, an analysis 1815 may be performed, a time-sensitive Adaboost 1840 may be applied, and community based dynamic models 1855 may be generated. The data set 1810 may include, for example, user log files (e.g., user click stream with time-stamps), user information (e.g., user's position in an organization or society, age, gender, etc.), and item information (e.g., title, abstract, and disclosure time of documents). The analysis section 1815 may include, for example content analysis 1820, dynamic pattern analysis 1825, and community analysis 1835, which may be conducted to extract static and dynamic features based on user log files and users' and documents' information. Then, users' implicit preferences may be inferred (described in more detail below). Time-Sensitive Adaboost 1840 may be applied to rank documents to get community-based dynamic models.

As previously noted, the analysis components may include feature extraction, for example, static feature extraction and/or dynamic feature extraction, which may be used in developing the community-based dynamic models. Further, the dynamic pattern analysis 1825 may also determine item expiration status 1830.

In the testing phase 1845, based on the community-based dynamic models 1855 and available documents 1850 in which expired documents are excluded, a rank list of documents 1865 (or items) may be provided. The rank list of documents may be inferred based on how likely one document is interesting to one group of users (e.g., a community). This may be achieved by using, for example, the Time-Sensitive Adaboost procedure, and the top-ranked documents may be recommended to the user(s)/entity(ies).

As previously noted, for formal community-based recommendation, Latent Dirichlet Allocation (LDA) may be used for content analysis. Given T topics, the probability of the i-th word in a given document may be formalized as:

$$P(w_i) = \sum_{j=1}^{T} P(w_i | z_i = j) P(z_i = j) \quad (7)$$

where $z_i$ may be a latent variable indicating the topic from which the ith word was drawn and $P(w_i|z_i=j)$ may be the probability of the word $w_i$ under the j-th topic. The term $P(z_i=j)$ may give the probability of choosing a word from topics j in the current document, which varies across different documents. Gibbs sampling may be applied to estimate $\phi_j^{(w)}$, the probability of using word w in topic j, and $\theta_j^{(d)}$, the probability of topic j in document d. In informal community-based recommendation, $P(z|w)$ may be estimated by Eq. (6). The recommendation generated based on formal community assumes that people/entities from the same organization have similar interests. This is true in some situations. Also, it is helpful in situations in which we do not have enough data to cluster people/entities. However, in some other situations, the organization chart may not be updated, or people in the same organization may still have different interests. It is hard to capture these points only based on the organization chart. Formal community is generated based on the previous preferences/interests of users. If the clustering method is perfect, each user will get the ideal recommendation by leveraging the users who have most similar interests with him/her. However, it may be difficult, if not impossible, to get the perfect clustering results. Also because of sparsity of the data, the clustering results may not be accurate and reliable. Thus, it may be better to leverage information of both formal and informal communities to improve the recommendation performance.

From the accessing patterns of documents, people's implicit interests on documents may be inferred; i.e., implicit user preference inference. If a user accesses one document, it may be inferred that this user is interested in this document. However, it may be difficult to infer which documents he or she does not like since it is not known what kind of documents he or she has seen in the data set but has decided to skip. On the other hand, the assumption may be made that if a document was accessed often by many people, and at that period, this user did not access it, he may not be interested in this document.

Identification of various features of the data information and user information may be useful in structuring the CBDR. Instead of relying on only content or collaborative aspect from what user(s)/entity(ies) may like, the system(s) and method(s) of the present invention may gain insight into a user's/entity's preferences about why they like particular items from both static and dynamic aspects. Some static features may include content aspects, author's organization, collaborative aspects, user title, etc. With respect to content aspect, $P(z|d)$, the probability of a topic given a document, may be considered as a content feature, and may estimated as $$P(z|d) = \sum_w P(z|w)P(w|d),$$

where $P(z|w)$ is estimated by the methods mentioned above. With respect to an author's organization, it may be observed that some people may tend to refer to various documents by authors with similar background. This may be represented by, for example, an organization ID with the various number of authors belonging to the particular organization. With respect to collaborative aspect, a user's/entity's organization ID may serve as the collaborative feature for formal community-based recommendation. $P(g|u)$, the probability of a user cluster given a user, obtained by Eq. (6), may serve as the collaborative feature for informal community-based recommendation. With respect to user/entity title, as previously mentioned with reference to FIG. 9, users'/entities' titles and their intentions in using the ER system may be highly correlated. Thus, in this case, the user's/entity's title may be used as one of the static features for predicting the user's interests and preferences. Users' titles may include, for example, executive, division head, chief manager, worker, etc.

Some dynamic features may include, for example, freshness of the data, item, or information (e.g., documents), life-span of data, item, or information (e.g., short-term or long-term type document), popularity of the data, item, or information (e.g., document), and/or user intention. With respect to freshness of, for example, documents, every document may have a life-time period of value. Even for a very famous paper, its usefulness will still decay over time. The freshness of a document may be represented as the difference between user's login time and the disclosure time of the document. With respect to life-span, for example the short-term or long-term type of the document, the probability of how likely one document belongs to the short-term type may be set as the feature of the document's type. With respect to popularity of the data, item, information, in the case of documents, similar to the popularity of the authors, the popularity of documents may also be taken into consideration, represented by how many times one document was downloaded by others during a time period. With respect to user intention, the probability of how likely one user will access the data, item, information, for example download short-term documents, may be set as a feature for the user intention.

Although various static and dynamic feature have been presented herein with respect to applying the present invention to document recommendation, one skilled in the art would recognize that numerous variations in the particular static and dynamic features that may be considered will be driven by the particular data set to which the invention is being applied and the particular desired result (e.g. providing future prediction, recommendation, etc.) one wishes to achieve. Therefore, the present invention is not limited to the particular examples or applications provided herein, and particularly to the various static and dynamic features that may be included or considered in generating an improved outcome.

In any case, give the identification of the various features, these may be applied to, for example, a recommendation model. Given a particular set of features representing, for example, one document, the recommendation model $P(c=1|x,t)$ may represents what kind of documents one user may be interested in during one time period, where $c=1$ or $0$, respectively, indicating whether the user may be interested or not in this documents, where x may represent the features for judgment and t may represent a time stamp for a particular user login. As previously noted, a time-sensitive Adaboost method may be used to incorporate the evolutionary interest changes of a user' entity. The Adaboost algorithm may be a stage-wise estimation procedure for fitting an additive logistic regression model by minimizing a loss function. The simple rules may be trained sequentially; each rule may be trained on examples which are most difficult to classify by the preceding rules. One exemplary approach may be using a Real Adaboost procedure which finds an $$F(x) = \frac{1}{2} \log \frac{p(c=1|x)}{p(c=-1|x)}$$

that minimizes $E\{\exp(-cF(x))\}$, with the logistic regression model up to a factor of 2. For user profiling, it may be assume the class conditional probability indicating which document a user may be interested in given the feature x of the document as $P(c=1|x,t)$, and it may be model as a logistic regression function:

$$P(c=1|x,t) = \frac{\exp(Q(x,t))}{1+\exp(Q(x,t))} \quad (8)$$

may also be written as $$\log \frac{P(c=1|x,t)}{P(c=-1|x,t)} = Q(x,t) \quad (9)$$

Comparing the function Q with F, a class conditional probability may be obtained as:

$$P(c=1|x,t) = \frac{\exp^2\left(\sum_{k=1}^{K} \omega_k h_k\right)}{1+\exp^2\left(\sum_{k=1}^{K} \omega_k h_k\right)} \quad (10)$$

where $h_k$ are hypotheses and $\omega_k$ are parameters to indicate how reliable and important each hypothesis is. After obtaining the weak hypotheses $h_k$, they may be plugged into Eq. (10) to get the probability of how likely an item (e.g., document) will be of interests to a user.

Observing more recent behaviors may be more useful for predicting a user's/entity's current behaviors, a time-sensitive Adaboost model may be useful at addressing this problem. Recall that for Adaboost, the goal may be to minimize $$\sum_{i=1}^{N} \exp\left(-c_i \sum_{j=1}^{S} \omega_j h_j(x_i)\right) \quad (11)$$

which is an exponential loss function. All the samples may be regarded equally important at the beginning of the learning process. For a time-sensitive problem, the current data may be given larger weights indicating the importance of being separated. Then, the energy function may be changed to $$\sum_{i=1}^{m} \exp\left(-c_i \sum_{j=1}^{n} \omega_j \exp(-\tau_j \Box(t-t_i)) h_j(x_{i,t_i})\right) \quad (12)$$

where t may be the current time for applying the model, $t_i$ may indicate the time stamp for i-th sample. The minimization goal may be achieved by assigning different initial weights to different samples at the beginning of leaning. Details of an exemplary time-sensitive Adaboost algorithm are illustrated in Table I below.

TABLE I

Time-sensitive Adaboost Algorithm

Algorithm: Time-sensitive Adaboost
Given: $(x_1, c_1, t_1), \ldots, (x_N, c_N, t_N)$ where $x_i \in X$,
$c_i \subseteq C$, N is the size of samples in the training set;
For $s = 1, \ldots, S$
    Initialize $D_1(i) = 1/(N\Box\exp(t-t_i))$.
    Set the weight $\alpha_t$ of the current weak hypothesis $h_i$
    according to its error rate $r_t$ $$\alpha_t = \frac{1}{2} \log\left(\frac{1+r_t}{1-r_t}\right)$$

where $r_t = \Pr(h_s(x_t) \neq c_t)$.

$$\text{Update } D_{s+1}(i) = \frac{D_s(i) \exp(-\omega_s c_s h_s(x_i))}{Z_s}$$

where $Z_t$ is a normalization factor.
End
Find weak hypothesis by:

TABLE I-continued

Time-sensitive Adaboost Algorithm $$h_s = \arg \min_{h_j \in H} \varepsilon_j = \sum_{i=1}^{N} D_s(i) \, [c_i \neq h_j(x_i)].$$

Output the final hypothesis:
$H(x) = \text{sign}(F(x))$ where $F(x) = \sum_{t=1}^{S} \alpha_t h_t(x).$ Referring now to FIGS. 19-25, various experimental results for the present invention will be discussed. However, first a metric will be presented for off-line evaluation of the users' satisfaction about the recommendations. Then the performance of the community-based dynamic recommendation system(s) and method(s) as applied to the ER test data set will be described and discussed.

Instead of asking users/entities to manually rate recommendations, the community-based dynamic recommendation procedure may be evaluated by an off-line method based on the user log files from the ER system. The dataset may be divided into two sets: a training set and a testing set. The data from April 2004 to February 2005 may serve as the training data, and the data from the month of March 2005 may serve as the test data. In the original ER system, recommended documents are manually selected for all users to read. For evaluation purposes, five documents may be recommended for each user/entity that logged into the ER system in March 2005. The goal is to measure whether the recommended documents match the documents that the user really downloaded. Users' satisfaction may be calculated by measuring how many people really downloaded the documents among these five recommendations during the test period.

Using the community-based dynamic recommendation system(s) and method(s) of the present invention, the same list of documents may be recommended to people in the same community, where each person may be provided five documents that he or she has never downloaded. Terminology used in the evaluation is defined as follows.

"Community-based recommendation usefulness metric" may be defined as how many people downloads at least one, two, three, four, or five documents from the recommendation list during the test time period. Since it may be assumed that if a user downloads a document, he or she may be interested in this document, this metric measures how many documents out of the recommendation list this user is interested in.

"Global upper bound" may be define as the best performance a system can achieve in terms of global recommendation, if it already knows which items the system users will download during the testing period. "Global recommendation" defines that the same items are recommended to all users in the system. Given the system logs of the testing data, it can be found that the best items that maximize a usefulness metric by brute-force approaches. "Global upper bound" is the maximum usefulness metric that any recommendation system can achieve.

"Community upper bound" may be defined as the best performance a system can achieve in terms of community-based recommendation, if it already knows which items the users of a specific community will download during the testing period. "Community-based recommendation" defines that the same items are recommended to all users in a community. Given the system logs of the testing data, the best items can be found that maximize a usefulness metric by brute-force approaches. "Community upper bound" is the maximum usefulness metric that any recommendation system can achieve given the community clusters.

Figure 19:
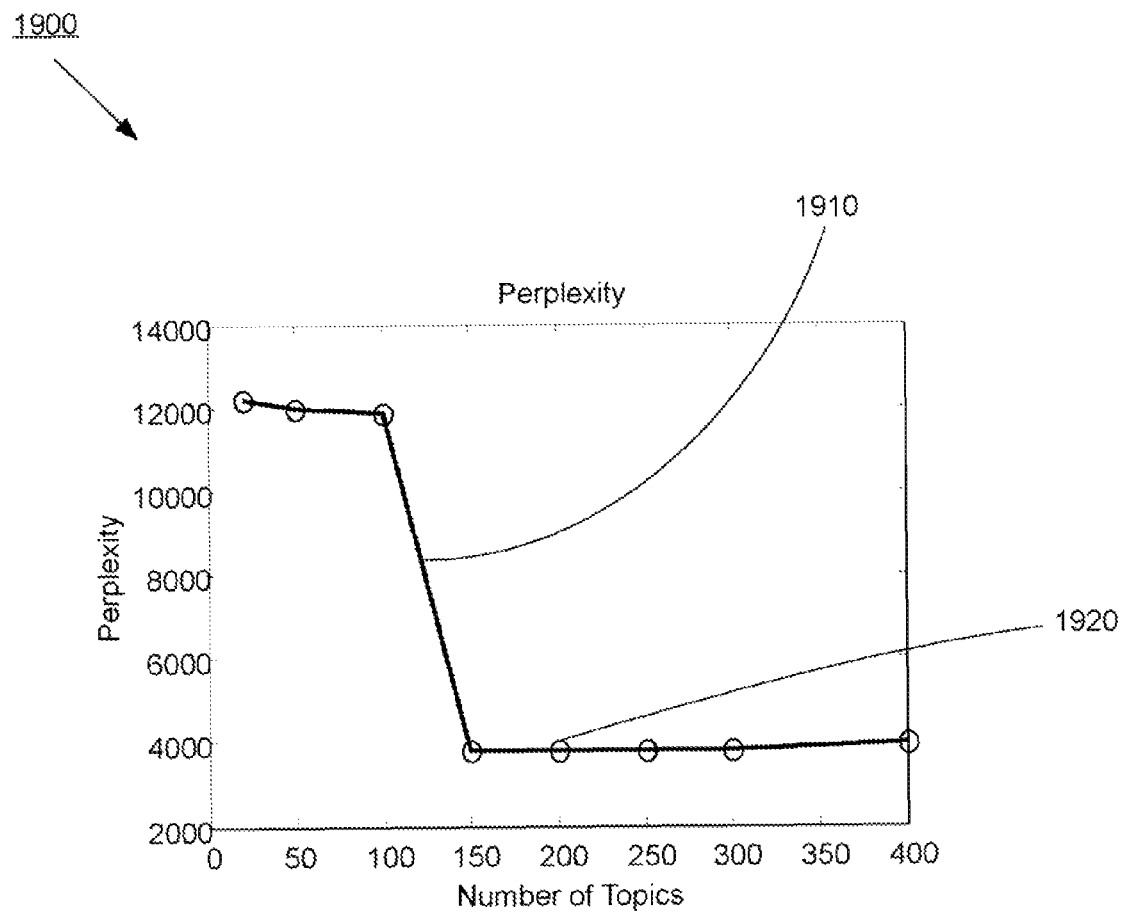
FIG. 19 is an exemplary model of selection results illustrating how the perplexity of a test set changes over the number of topics, according to at least one embodiment.

Referring now to FIG. 19, the graph 1900 illustrates how the perplexity changes over the number of topics T. To determine how many topics are there in the corpus, the perplexity of a held-out test set may be computed to evaluate the models. The perplexity, used by convention in language modeling, may be used to measure the predictability of a clustering algorithm, and may be algebraically equivalent to the inverse of the per-word likelihood geometric mean. A lower perplexity score may indicate better generalization performance. Formally, the perplexity may be determined by:

$$\text{Perplexity}(w_d) = \exp\left(-\frac{\log p(w_d)}{|w_d|}\right) \tag{13}$$

As illustrated by graph 1910, the minimum perplexity may be achieved in this case when T=200 (1920).

In the experiments that follow, 10% of the data was held out for test purposes and the models were trained on the remaining 90% of the data. In order to exclude casual users who had very few activities in the system, active users who downloaded at least 20 documents in the whole year may be selected, 10 documents in 2005, and 5 documents in March 2005 for experiments. As a result, 697 active users from 202 formal communities are selected based on this criterion.

Figure 20:
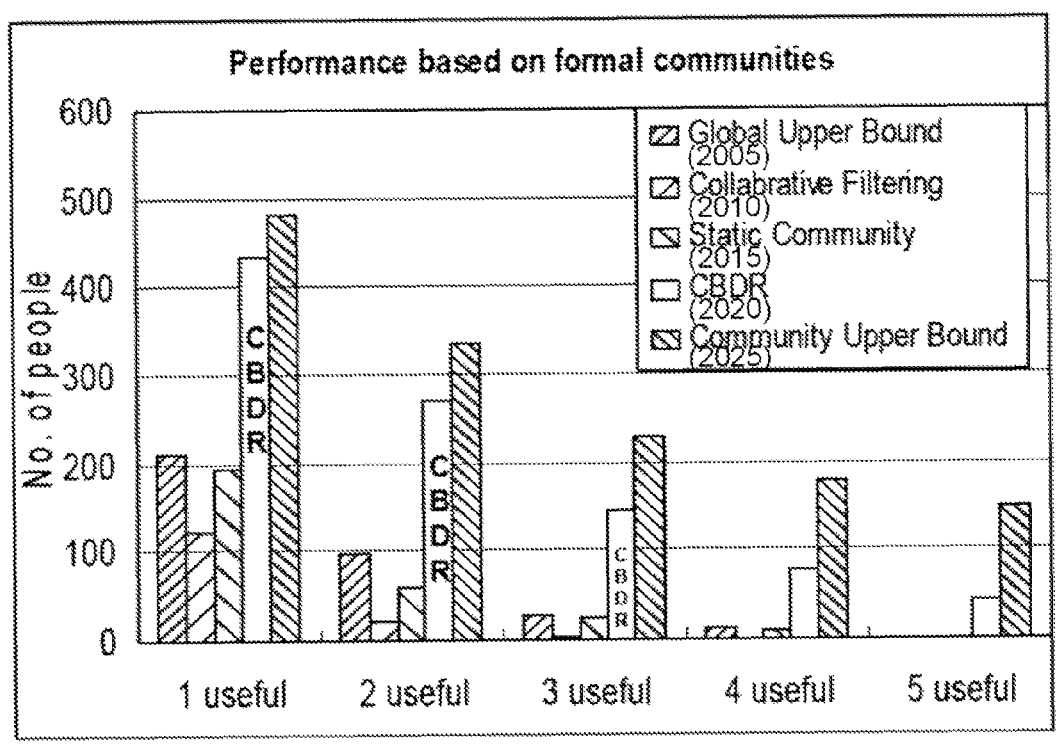
FIG. 20 is an exemplary comparison of the performance of formal community-based recommendations to global upper bound, collaborative filtering, community-based static recommendation, and community upper bound, based on formal communities, according to at least one embodiment.

FIG. 20 compares by a bar graph 2000 the performance of the formal community community-based dynamic recommendations 2020 to global upper bound 2005, collaborative filtering 2010, community-based static recommendation 2015, and community upper bound 2025. The formal community-based dynamic recommendations 2020 achieve the best performance compared to that of any global recommendation algorithms, collaborative filtering, and community-based static recommendation. In FIG. 20, the global upper bound of "at least one recommendation useful" is approximately 202 people/users/entities, and the community upper bound of "at least one recommendation useful" is 480 people/users/entities. With the CBDR method 2020, 430 people/users/entities consider at least one recommendation useful. Thus, it may be determined that, CBDR 2020 achieves 90.4% of the community upper bound 2025, is 106% better than the global upper bound 2005 and performs 126% better than community-based static recommendation 2015. Furthermore, since collaborative filtering 2010 can not recommend new documents, its performance is worse than the global upper bound 2005. In this case, the usefulness of CBDR 2020 is 259% better than collaborative filtering.

Figure 21:
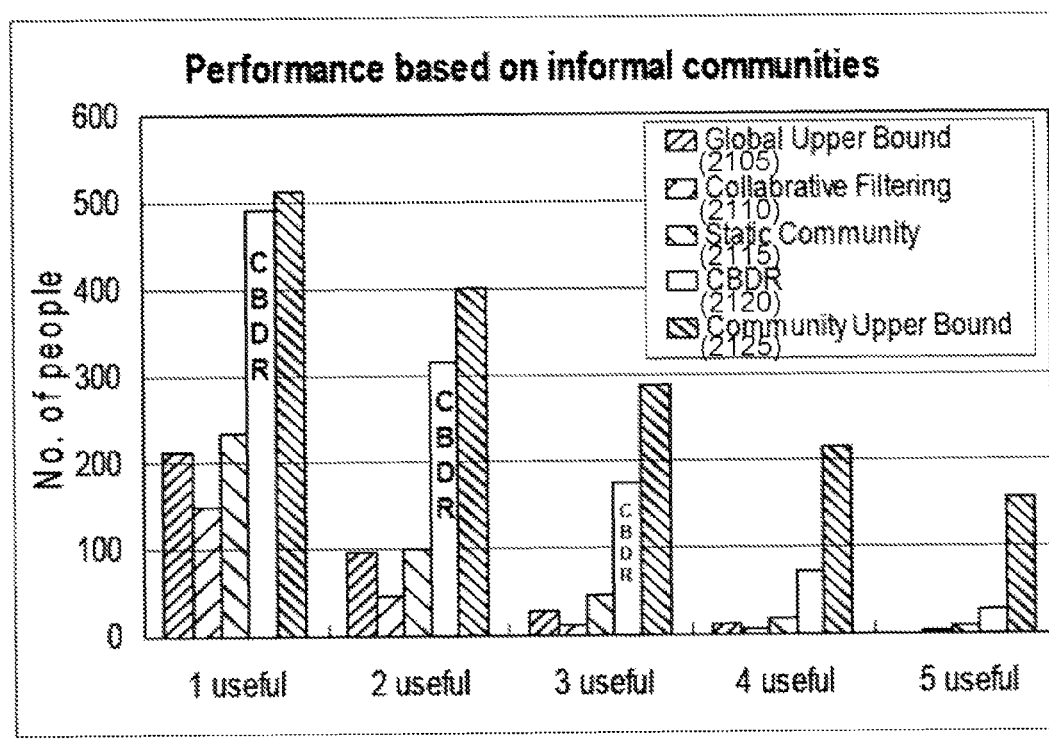
FIG. 21 is an exemplary comparison of the performance of informal community-based recommendations to global upper bound, collaborative filtering, community-based static recommendation, and community upper bound based on informal communities, according to at least one embodiment.

FIG. 21 compares by a bar graph 2100 the performance the proposed informal community community-based dynamic recommendations 2120 to that of global upper bound 2105, collaborative filtering 2110, community-based static recommendation 2115, and community upper bound 2125. To compare the performance of formal community and informal community community-based dynamic recommendations, the number of informal communities and formal communities may have the global upper bound 2105 be set the same—to 202. Compared to formal community community-based dynamic recommendations, the informal community community-based dynamic recommendations 2120 are 13% better, in terms of at least one useful document. The informal community CBDR 2120 scheme achieves 95.5% of the community upper bound 2125 of "at least one useful" document. Still, the informal community community-based dynamic recommendations 2120 achieve the best performance compared to any global recommendation 2105, collaborative filtering 2110 and community-based static recommendation 2115.

Figure 22:
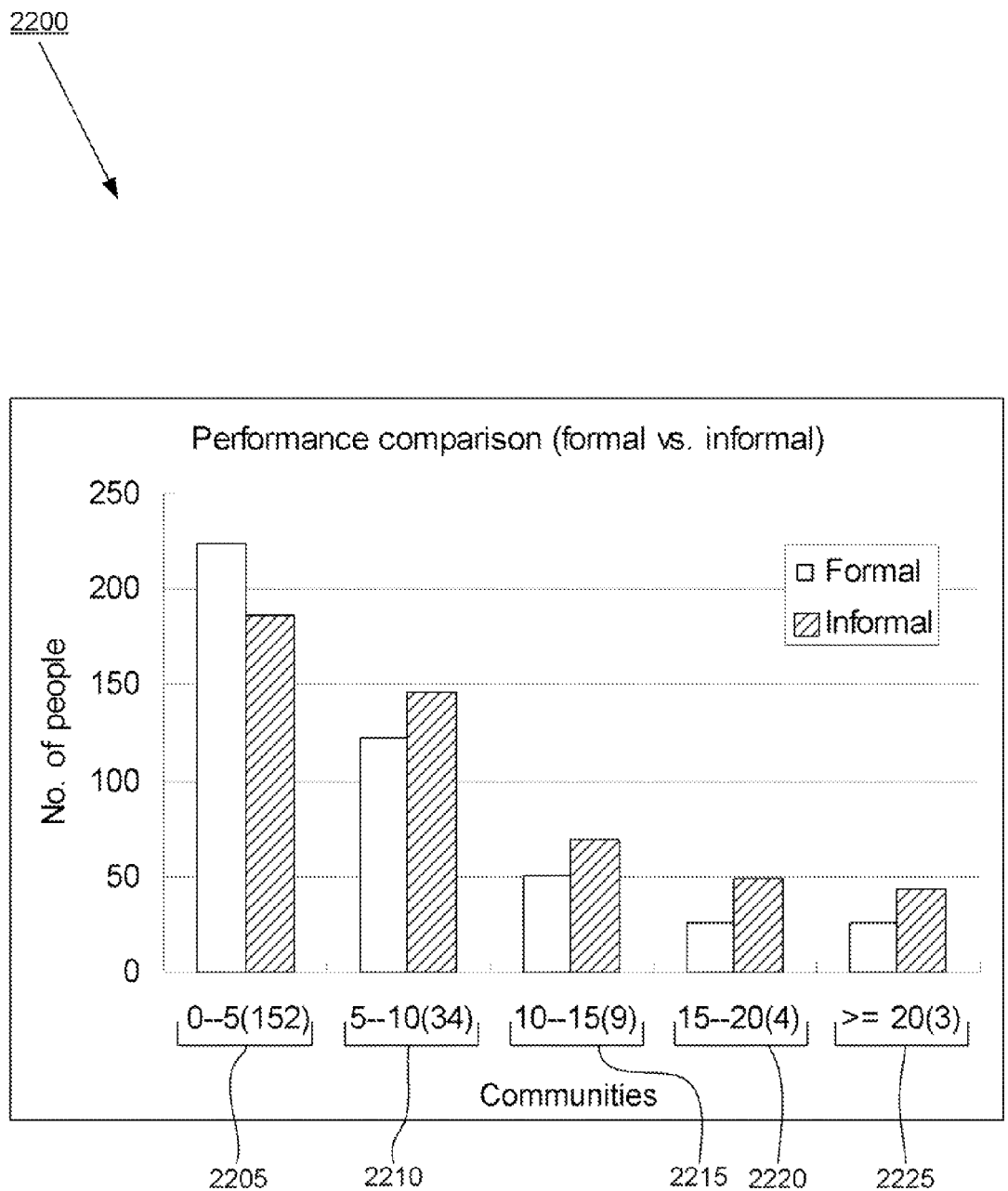
FIG. 22 is an exemplary illustration of the overall performance of formal and informal community-based recommendation in various communities, according to at least one embodiment.

To better understand the advantages of the informal community community-based dynamic recommendations compared to the formal community community-based dynamic recommendations, each formal community may be studies and compare the performance if each of its members is recommended by his formal community or informal community. FIG. 22 provides a bar graph 2200 that illustrates how the performance may differ on the communities with different number of people. Formal communities may be grouped into 5 clusters according to how many active users they have. There may be, for example, 152 communities only containing 0-5 people/users/entities (2205), 34 communities containing 5-10 people/users/entities (2210), 9 communities containing 10-15 people/users/entities (2215), 4 communities contain 15-20 people (2220), and 3 communities containing no less than 20 people/users/entities (2225). As may be seen from the graph 2200, for the formal communities with no less than 5 users (2210, 2215, 2220, 2225), informal community community-based dynamic recommendation achieves better performance than formal community community-based dynamic recommendation. This figure clearly shows that even though physically users belong to the same formal community, some of their preferences and interests are still not similar. Using informal community community-based dynamic recommendations can achieve better user satisfaction. However for those communities that contain less than 5 users (2205), formal community community-based dynamic recommendation can achieve better performance. In this case, data sparsity is a concern and people's formal organization helps in building consistent communities for recommendations.

Figure 23:
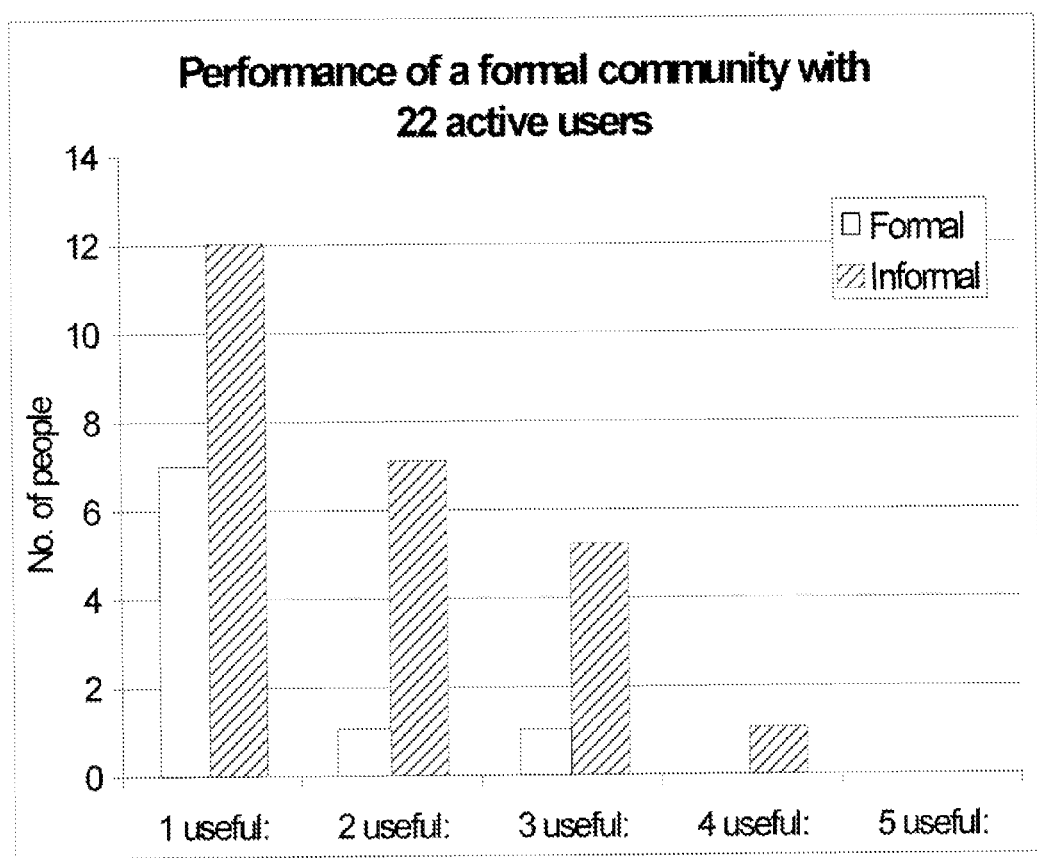
FIG. 23 is an exemplary illustration of the performance of formal and informal community-based recommendation in a community, according to at least one embodiment.
Figure 24:
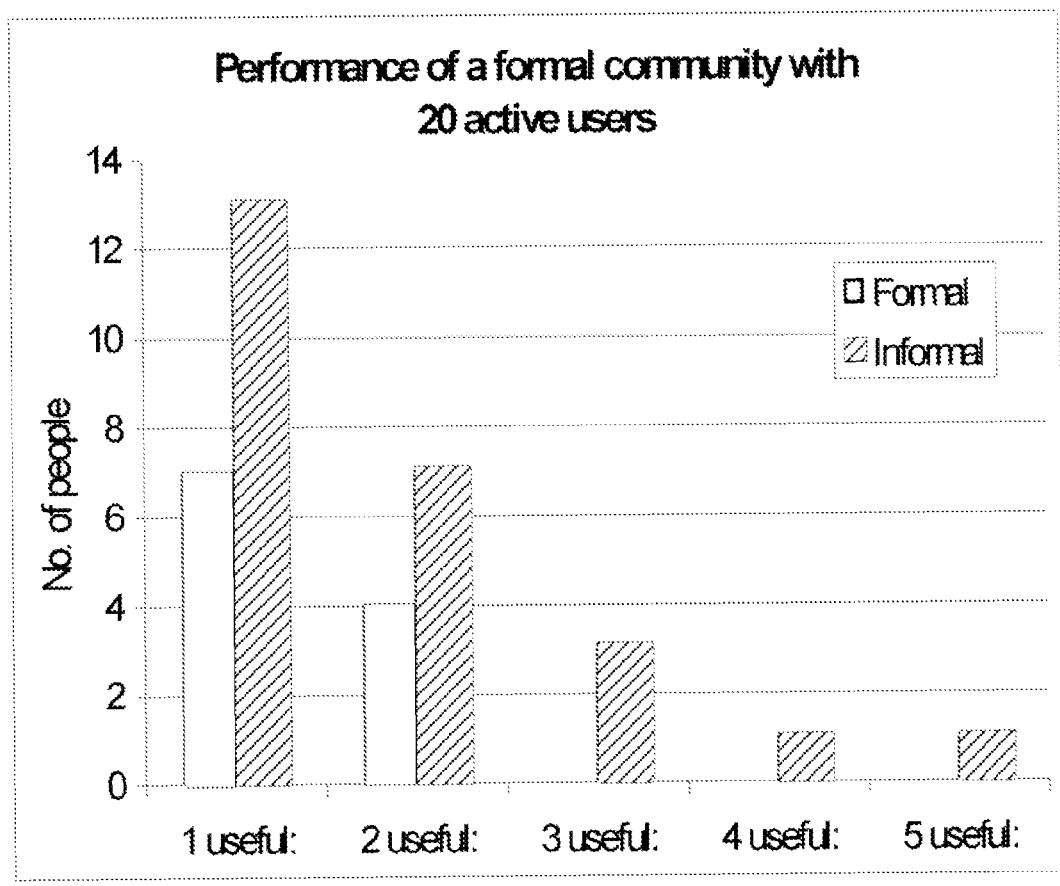
FIG. 24 is an exemplary illustration of the performance of formal and informal community-based recommendation for another community, according to at least one embodiment.

Referring now to FIGS. 23 and 24, these figures illustrate the performance comparison on the top 2 formal communities in the ER database. FIG. 23 provides a bar graph 2300 comparing the formal community and informal community results for the largest number of active users in the formal community. As can be seen, in this case, the informal community CBDR consistently outperforms the formal community CBDR. FIG. 24 provides a bar graph 2400 comparing the formal community and informal community results for the second largest of active users in the formal community. As can be seen, again in this case, the informal community CBDR consistently outperforms the formal community CBDR. Thus, this suggests that informal community CBDR can achieve much better performance for these relatively large communities.

Figure 25:
FIG. 25 is an exemplary illustration of the performance sensitivity of formal and informal community-based recommendation, according to at least one embodiment.
Figure 25:
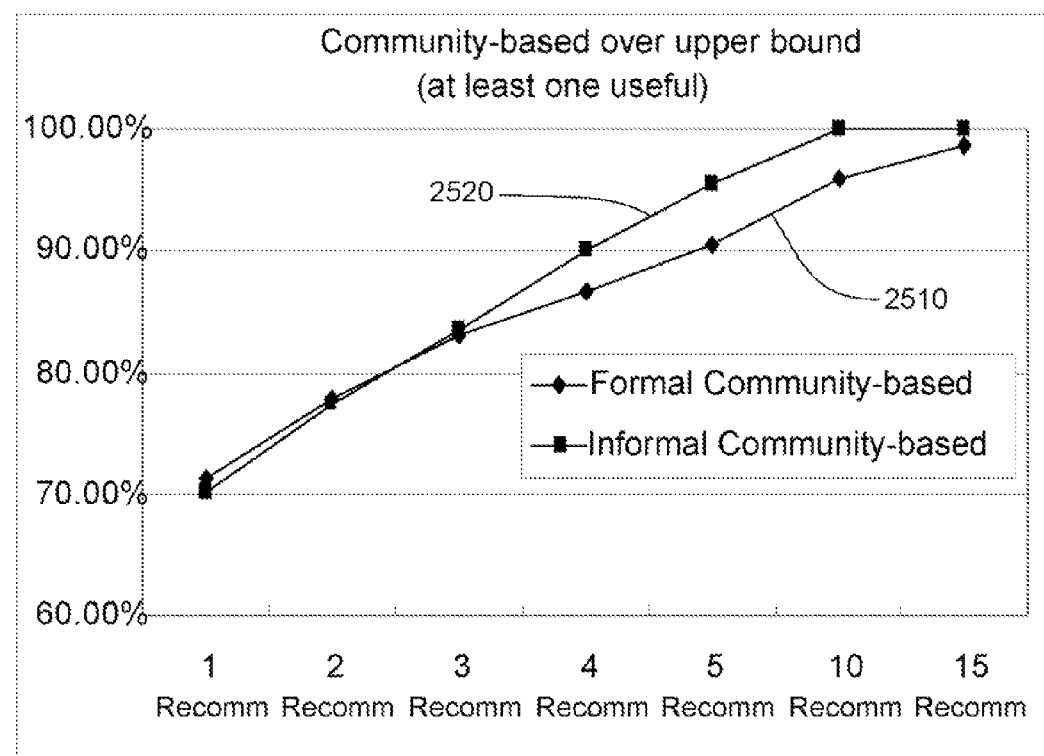

Referring to FIG. 25, an exemplary illustration of the performance sensitivity of formal community and informal community CBDR is provided, according to at least one embodiment of the invention. In previous experiments, it may be assumed that the number of recommendations given to the users is five. To study the sensitivity of the performance changing over the number of recommendations, studies were done of the ratios of the number of people who regard at least one recommendation useful out of the top n recommendations, where n=1, 2, . . . 5, 10, 15, over the community upper bound. The graph 2500 in FIG. 25 illustrates the performance curves of formal community CBDR 2510 and informal community CBDR 2520. This graph suggests that the ratios increase almost linearly when $n \leq 5$, and get saturated after that. Thus, n=5 is a good choice for the number of recommendations that may be given to users/entities.

As shown by these experimental results, the CDBR technique provides improved prediction and/or recommendation results than what may be obtained using conventional approaches. Taking the dynamic aspects of items and users into consideration results in improved results. The experimental results on the ER on-line application system demonstrate the recommendation usefulness of the formal CBDR scheme is 106% better than the global recommendation upper bound, 259% better than the collaborative filtering, and 126% better than the static recommendation algorithm. Furthermore, the informal CBDR method also shows 13% improvement over the formal CBDR method.

As noted, in various embodiments, the system(s) and method(s) provided herein may be implemented using a computing device, for example, a personal computer, a server, a mini-mainframe computer, and/or a mainframe computer, etc., programmed to execute a sequence of instructions that configure the computer to perform operations as described herein. In various embodiments, the computing device may be, for example, a personal computer available from any number of commercial manufacturers such as, for example, Dell Computer of Austin, Tex., running, for example, the Windows™ XP™ and Linux operating systems, and having a standard set of peripheral devices (e.g., keyboard, mouse, display, printer).

Figure 26:
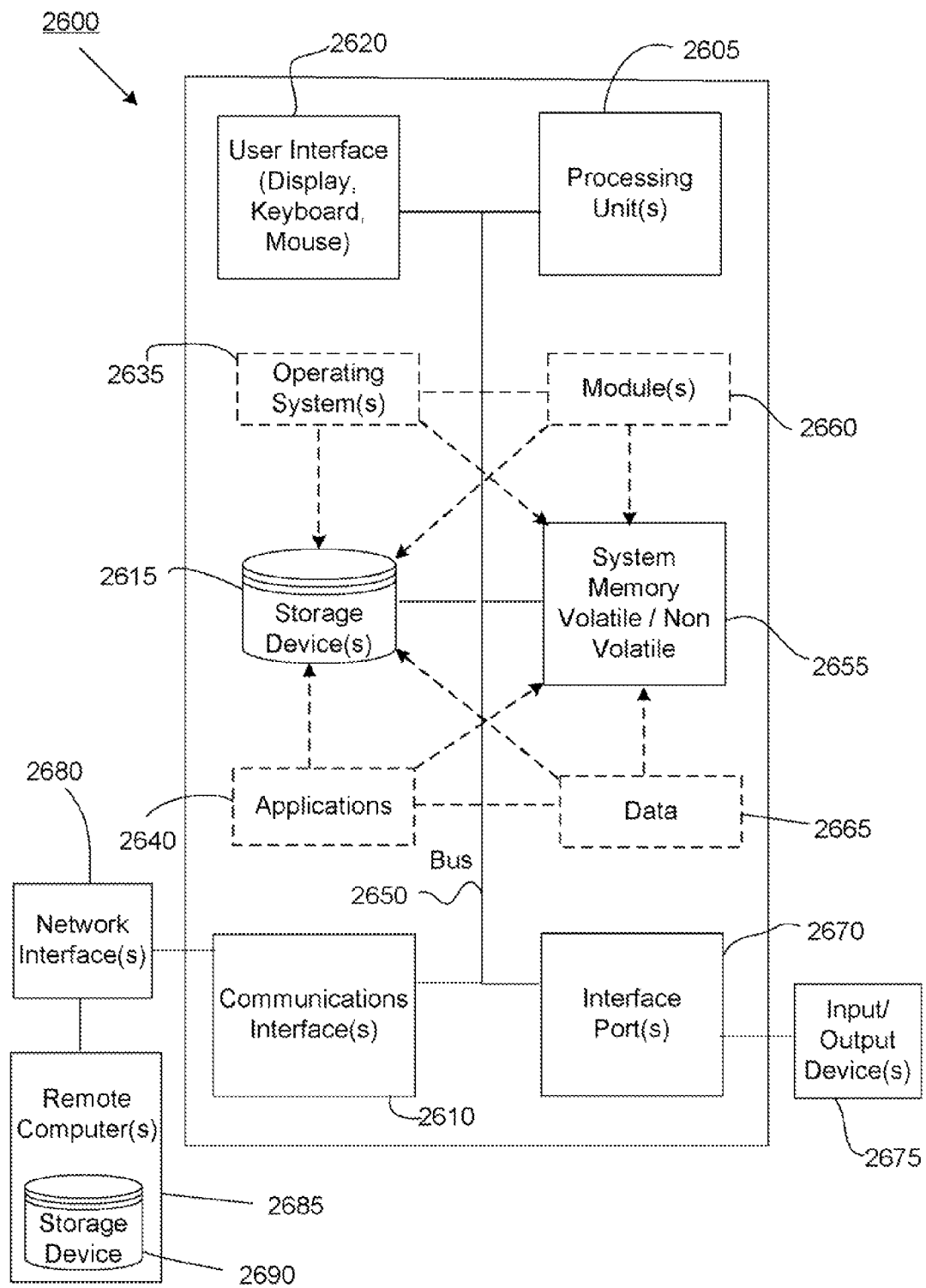
FIG. 26 is an exemplary block diagram of a computing device, according to at least one embodiment.

FIG. 26 is a functional block diagram of one embodiment of a computing device 2600 that may be useful for hosting software application programs implementing the system(s) and method(s) described herein. Referring now to FIG. 26, the computing device 2600 may include a processing unit 2605, communications interface(s) 2610, storage device(s) 2615, a user interface 2620, operating system(s) instructions 2635, application executable instructions/API 2640, all provided in functional communication and may use, for example, a data bus 2650. The computing device 2600 may also include system memory 2655, data and data executable code 2665, software modules 2660, and interface port(s). The Interface Port(s) 2670 may be coupled to one or more input/output device(s) 2675, such as printers, scanner(s), all-in-one printer/scanner/fax machines, etc. The processing unit(s) 2605 may be one or more microprocessor(s) or microcontroller(s) configured to execute software instructions implementing the functions described herein. Application executable instructions/APIs 2640 and operating system instructions 2635 may be stored using computing device 2600 on the storage device(s) 2615 and/or system memory 2655 that may include volatile and nonvolatile memory. Application executable instructions/APIs 2640 may include software application programs implementing the present invention system(s) and method(s). Operating system instructions 2635 may include software instructions operable to control basic operation and control of the processor 2605. In one embodiment, operating system instructions 2635 may include, for example, the XP™ operating system available from Microsoft Corporation of Redmond, Wash.

Instructions may be read into a main memory from another computer-readable medium, such as a storage device. The term "computer-readable medium" as used herein may refer to any medium that participates in providing instructions to the processing unit 2605 for execution. Such a medium may take many forms, including, but not limited to, non-volatile media, volatile media, and transmission media. Non-volatile media may include, for example, optical or magnetic disks, thumb or jump drives, and storage devices. Volatile media may include dynamic memory such as a main memory or cache memory. Transmission media may include coaxial cable, copper wire, and fiber optics, including the connections that comprise the bus 2650. Transmission media may also take the form of acoustic or light waves, such as those generated during Radio Frequency (RF) and Infrared (IR) data communications. Common forms of computer-readable media include, for example, floppy disk, a flexible disk, hard disk, magnetic tape, any other magnetic medium, Universal Serial Bus (USB) memory stick™, a CD-ROM, DVD, any other optical medium, a RAM, a ROM, a PROM, an EPROM, a Flash EPROM, any other memory chip or cartridge, a carrier wave as described hereinafter, or any other medium from which a computer can read.

Various forms of computer-readable media may be involved in carrying one or more sequences of one or more instructions to the processing unit(s) 2605 for execution. For example, the instructions may be initially borne on a magnetic disk of a remote computer(s) 2685 (e.g., a server, a PC, a mainframe, etc.). The remote computer(s) 2685 may load the instructions into its dynamic memory and send the instructions over a one or more network interface(s) 2680 using, for example, a telephone line connected to a modem, which may be an analog, digital, DSL or cable modem. The network may be, for example, the Internet, and Intranet, a peer-to-peer network, etc. The computing device 2600 may send messages and receive data, including program code(s), through a network of other computer(s) via the communications interface 2610, which may be coupled through network interface(s) 2680. A server may transmit a requested code for an application program through the Internet for a downloaded application. The received code may be executed by the processing unit(s) 2605 as it is received, and/or stored in a storage device 2615 or other non-volatile storage 2655 for later execution. In this manner, the computing device 2600 may obtain an application code in the form of a carrier wave.

The present system(s) and method(s) may reside on a single computing device or platform 2600, or on multiple computing devices 2600, or different applications may reside on separate computing devices 2600. Application executable instructions/APIs 2640 and operating system instructions 2635 may be loaded into one or more allocated code segments of computing device 2600 volatile memory for runtime execution. In one embodiment, computing device 2600 may include system memory 2655, such as 512 MB of volatile memory and 80 GB of nonvolatile memory storage. In at least one embodiment, software portions of the present invention system(s) and method(s) may be implemented using, for example, C programming language source code instructions. Other embodiments are possible.

Application executable instructions/APIs 2640 may include one or more application program interfaces (APIs). The system(s) and method(s) of the present invention may use APIs 2640 for inter-process communication and to request and return inter-application function calls. For example, an API may be provided in conjunction with a database 2665 in order to facilitate the development of, for example, SQL scripts useful to cause the database to perform particular data storage or retrieval operations in accordance with the instructions specified in the script(s). In general, APIs may be used to facilitate development of application programs which are programmed to accomplish some of the functions described herein.

The communications interface(s) 2610 may provide the computing device 2600 the capability to transmit and receive information over the Internet, including but not limited to electronic mail, HTML or XML pages, and file transfer capabilities. To this end, the communications interface 2610 may further include a web browser such as, but not limited to, Microsoft Internet Explorer™ provided by Microsoft Corporation. The user interface(s) 2620 may include a computer terminal display, keyboard, and mouse device. One or more Graphical User Interfaces (GUIs) also may be included to provide for display and manipulation of data contained in interactive HTML or XML pages.

Figure 27:
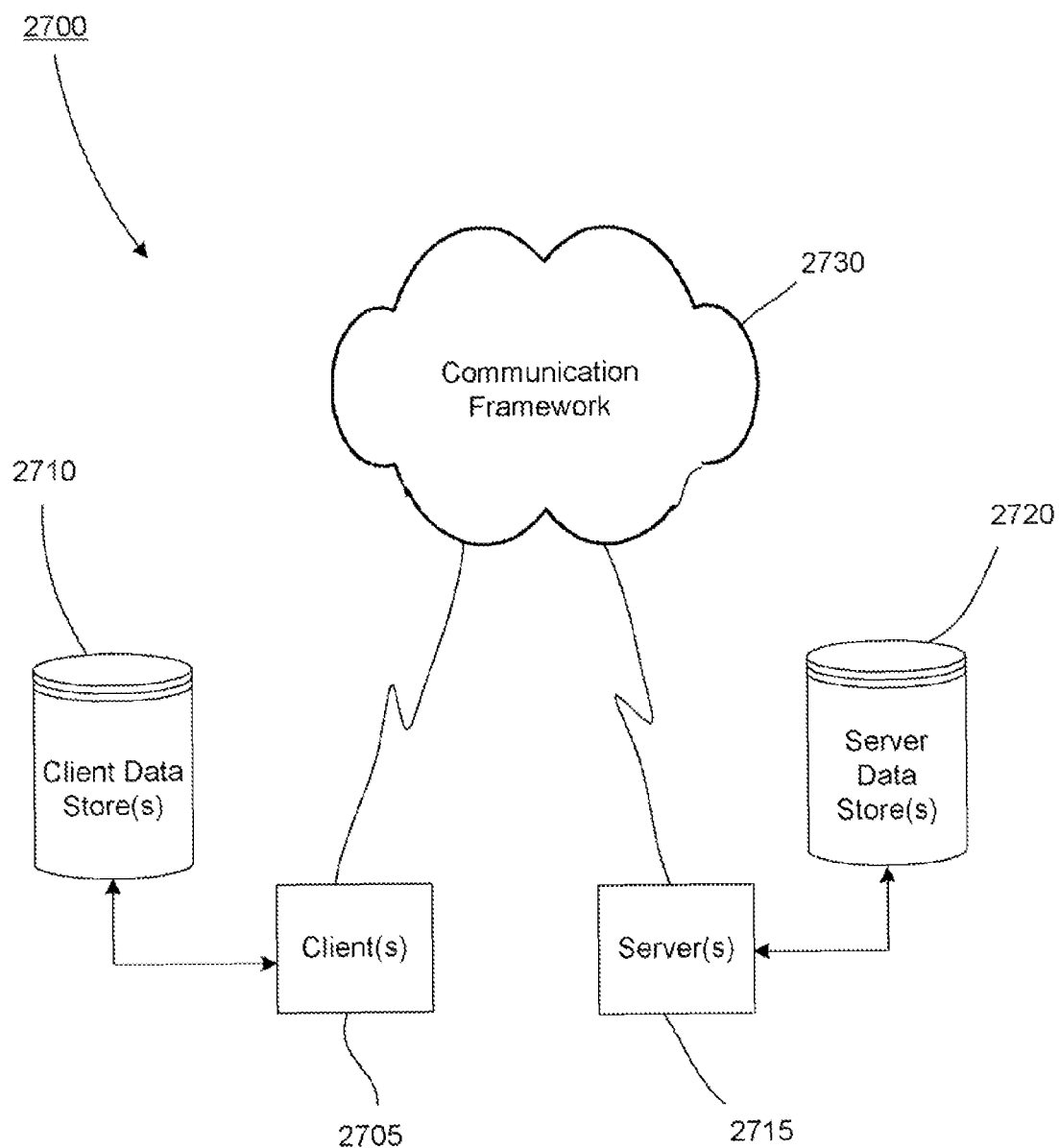
FIG. 27 is an exemplary block diagram illustrating a network, according to at least one embodiment.

Referring now to FIG. 27, a network 2700 upon which the system(s) and method(s) may operate, is illustrated. As noted above, the system(s) and method(s) of the present patent application may be operational on one or more computer(s). The network 2700 may include one or more client(s) 2705 coupled to one or more client data store(s) 2710. The one or more client(s) may be coupled through a communication network (e.g., fiber optics, telephone lines, wireless, etc.) to the communication framework 2730. The communication framework 2730 may be, for example, the Internet, and Intranet, a peer-to-peer network, a LAN, an ad hoc computer-to-computer network, etc. The network 2700 may also include one or more server(s) 2715 coupled to the communication framework 2730 and coupled to a server data store(s) 2720. The present invention system(s) and method(s) may also have portions that are operative on one or more of the components in the network 2700 so as to operate as a complete operative system(s) and method(s).

To conclude, the present invention may be implemented on the computer system 2600 and/or the computer network 2700. As such, various embodiments of the present invention may provide an adaptive user-centric modeling technology that investigates contextual, relational, and temporal information, and may do so simultaneously. Dynamic factors from both documents and users, including documents of long-term or short-term interests, document expiration times, users' intentions, and users' evolving interests, may be exploited. In various embodiments, a community-based dynamic recommendation scheme may be used, in which people from the same community will be provided with the same recommendation of items so that new users may be assigned a community profile and benefit from the experience of other users. In various embodiments, a Content-Time-Community (CTC) model may be applied for finding people of similar interests to build evolutionary informal communities. Further, an adaptive user model, for example, a time-sensitive Adaboost procedure may be used for ranking various items (e.g., documents) based on leveraging features including, for example, static aspects, freshness, popularity, and other attributes for inferring dynamic user interests and/or community information.

While embodiments of the invention have been described above, it is evident that many alternatives, modifications and variations will be apparent to those skilled in the art. In general, embodiments may relate to the automation of these and other business processes in which analysis of data is performed. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents All publications, patents, and patent applications cited herein are hereby incorporated by reference in their entirety for all purposes.

We claim:

1. A method of data analysis, comprising:
   determining with a processor dynamic patterns over time of user characteristics;
   determining with a processor dynamic patterns over time of information of interest to users; and
   generating with a processor predictions or recommendations based on users' dynamic pattern variations and documents' dynamic patterns.

2. The method of claim 1, wherein the dynamic patterns over time of user characteristics includes user intention and change in user interest.

3. The method of claim 1, wherein dynamic patterns over time of information of interest to users includes long-term information and short-term information grouping and information expiration date prediction.

4. The method of claim 3, wherein the long-term information or the short-term information item is a document.

5. The method of claim 1, further comprising the step of creating formal communities of users and/or informal communities of users using time as a factor.

6. The method of claim 5, wherein a content-time-community model creates the informal communities.

7. The method of claim 1, further comprising the step of providing an adaptive user model to generate the predictions or recommendations.

8. The method of claim 7, wherein the adaptive user model is a stage-wise estimation procedure for fitting an additive logistic regression model by minimizing a loss function.

9. The method of claim 7, wherein the adaptive user model is a time-sensitive Adaboost procedure.

10. A data analysis system, comprising:
    a memory;
    a processor configured to:
    determine dynamic patterns over time of user characteristics;
    determine dynamic patterns over time of information of interest to users; and
    generate predictions or recommendations based on users' dynamic pattern variations and documents' dynamic patterns.

11. The system of claim 1, wherein the dynamic patterns over time of user characteristics includes user intention and change in user interest.

12. The system of claim 1, wherein dynamic patterns over time of information of interest to users includes long-term information and short-term information grouping and information expiration date prediction.

13. The system of claim 12, wherein the long-term information or the short-term information item is a document.

14. The system of claim 10, further comprising means for creating formal communities of users and/or informal communities of users using time as a factor.

15. The system of claim 14, wherein a content-time-community model creates the informal communities.

16. The system of claim 10, further comprising means for providing an adaptive user model to generate the predictions or recommendations.

17. The system of claim 16, wherein the adaptive user model is a stage-wise estimation procedure for fitting an additive logistic regression model by minimizing a loss function.

18. The system of claim 16, wherein the adaptive user model is a time-sensitive Adaboost procedure.

* * * * *